(12) United States Patent
Sakanishi

(10) Patent No.: US 6,678,888 B1
(45) Date of Patent: Jan. 13, 2004

(54) METHOD AND SYSTEM FOR SOFTWARE DISTRIBUTION

(75) Inventor: Yoshiko Sakanishi, Ashigarakamigun (JP)

(73) Assignee: Hitachi, Ltd., Tokyo (JP)

(*) Notice: Subject to any disclaimer, the term of this patent is extended or adjusted under 35 U.S.C. 154(b) by 475 days.

(21) Appl. No.: 09/648,038

(22) Filed: Aug. 25, 2000

(30) Foreign Application Priority Data

Aug. 26, 1999 (JP) .......................................... 11-239173

(51) Int. Cl.$^7$ ................................................ G06F 9/44
(52) U.S. Cl. ................... 717/172; 717/169; 717/171; 717/173; 717/177; 717/178; 709/201; 709/203; 707/203
(58) Field of Search ................................ 717/168–178; 709/203, 221, 201; 707/103 R, 203, 511

(56) References Cited

U.S. PATENT DOCUMENTS

| | | | | |
|---|---|---|---|---|
| 5,008,814 A | * | 4/1991 | Mathur | 709/221 |
| 5,247,683 A | * | 9/1993 | Holmes et al. | 709/221 |
| 5,339,430 A | * | 8/1994 | Lundin et al. | 709/332 |
| 5,403,639 A | * | 4/1995 | Belsan et al. | 707/204 |
| 5,495,610 A | * | 2/1996 | Shing et al. | 709/221 |
| 5,649,200 A | * | 7/1997 | Leblang et al. | 717/122 |
| 5,666,501 A | * | 9/1997 | Jones et al. | 345/748 |
| 5,701,472 A | * | 12/1997 | Koerber et al. | 707/203 |
| 5,706,431 A | * | 1/1998 | Otto | 709/221 |
| 5,721,824 A | * | 2/1998 | Taylor | 709/203 |
| 5,754,841 A | * | 5/1998 | Carino, Jr. | 707/3 |
| 5,806,062 A | * | 9/1998 | Chen et al. | 707/4 |
| 5,878,432 A | * | 3/1999 | Misheski et al. | 707/103 R |
| 5,978,916 A | * | 11/1999 | Randall | 713/200 |
| 6,049,670 A | * | 4/2000 | Okada et al. | 717/177 |
| 6,112,024 A | * | 8/2000 | Almond et al. | 717/122 |
| 6,134,593 A | * | 10/2000 | Alexander et al. | 709/229 |
| 6,151,643 A | * | 11/2000 | Cheng et al. | 710/36 |
| 6,182,286 B1 | * | 1/2001 | Sigal et al. | 717/122 |
| 6,209,128 B1 | * | 3/2001 | Gerard et al. | 717/108 |
| 6,282,712 B1 | * | 8/2001 | Davis et al. | 717/170 |
| 6,289,511 B1 | * | 9/2001 | Hubinette | 717/173 |
| 6,298,476 B1 | * | 10/2001 | Misheski et al. | 717/101 |
| 6,330,717 B1 | * | 12/2001 | Raverdy et al. | 717/170 |
| 6,367,077 B1 | * | 4/2002 | Brodersen et al. | 717/170 |
| 6,496,871 B1 | * | 12/2002 | Jagannathan et al. | 709/317 |
| 6,519,767 B1 | * | 2/2003 | Carter et al. | 717/140 |

FOREIGN PATENT DOCUMENTS

| | | |
|---|---|---|
| JP | 4-175952 | 6/1992 |
| JP | 07334436 | 12/1995 |
| JP | 10083280 | 3/1998 |
| JP | 10301760 | 11/1998 |

OTHER PUBLICATIONS

Title: Software Resource Distribution Control System, DOC ID: JP 07334436 A.*
Title: Automatic Distribution System for Software, DOC ID: JP 073344436 A.*
Title: Automatic Software Distribution Management System and Method, DOC ID: JP 10301760 A.*

(List continued on next page.)

*Primary Examiner*—Chameli C. Das
(74) *Attorney, Agent, or Firm*—Townsend and Townsend and Crew LLP

(57) ABSTRACT

A software distribution system includes a first management means is provided for controlling premise software. A second management means is provided to controls already installed software. A third management means is provided for controlling software affected by software updates. A distribuied-software determination means determines software to be distributed in accordance with a received command making a request for distribution of the software.

16 Claims, 19 Drawing Sheets

OTHER PUBLICATIONS

TITLE: OS/2 Display Driver Installation tool TDB–ACC–No.: NN953321, IBM Technical Disclosure, Date: Mar. 1, 1995.*

TITLE: Safe Mechanism for Installing Operating System Updates with Applications, TDB–ACC–No.: NN9801557, IBM Technica Disclosure, Date: Jan. 1, 1998.*

TITLE: Design of the Commit Install Plan Process for a Network Installation Program, TDB–ACC–No.: NN9507357, IBM Technic Disclosure, Date: Jul. 1, 1995.*

TITLE: Install Control System for Software, Method Therefor and Recording Medium Recorded with Program Therefor, author: Takeshi, Pub. No.: JP4112451A, date: Oct. 8, 1999.*

TITLE: Software Distribution System and Recording Medium Stored with Program used for the same, author: Masahiro et al, Pub No.: JP411272471A, date: Oct. 8, 1999.*

TITLE: Concepts in configuration management systems, author: Susan Dart, ACM, May 1991.*

TITLE: VerSE: Towards Hypertext Versioning Sytles, author: Haake et al, ACM, 1996.*

* cited by examiner

FIG.3

```
Typical software information file

ProductID=ProgramA
ProductName=ProgramA
ProductVersion=005
Media=1, SourcePath=¥TEST¥BIN¥ProgramA.exe
Media=1, SourcePath=¥TEST¥BIN¥UnInstall.exe
DefaultInstallPath=c:¥
UnInstallPath=¥TEST¥BIN¥UnInstall.exe
DiskSpace=2882018
Data=19990520214940
TotalInstallTime=00:12:35
Price=¥15000
TagetOS=Windows NT, MinimumVersion=3.51
Premise=HW, CPU, LowerVersion=i486
Premise=SW, ProgramAA, LowerVersion=002, UpperVersion=005
                            :
```

FIG.4

Software management table entry

| Software-identifying ID | Software name | Version | Software information file name | File name | ... |
|---|---|---|---|---|---|
| 11 | 12 | 13 | 14 | 15 | |

FIG.5

System-cataloged-software management table entry

| Software-identifying ID | Software name | Version | Software information file name | File name | Control-system information |
|---|---|---|---|---|---|
| 21 | 22 | 23 | 24 | 25 | 26 |

FIG.6

Already-installed software management table entry

| Software-identifying ID | Version | Priority | ... |
|---|---|---|---|
| 31 | 32 | 33 | |

FIG.7

Affected-software management table entry

| Software-identifying ID | Version | ... |
|---|---|---|
| 41 | 42 | |

FIG.8

Premise-software table entry

| Software-identifying ID | Low-limit version | High-limit version |
|---|---|---|
| 51 | 52 | 53 |

FIG.9

Distribution-object-software table entry

| Candidate number | Software-identifying ID | Low-limit version | High-limit version |
|---|---|---|---|
| 61 | 62 | 63 | 64 |

FIG.10

Typical distribution-command table entry

| Software-identifying ID | Version | File name | Software information file name | Controlled system | Priority | Order |
|---|---|---|---|---|---|---|
| 71 | 72 | 73 | 74 | 75 | 76 | 77 |

FIG.11

Software-installation-result notification table entry

| Software-identifying ID | Version | Priority | Controlled system | Results | ... |
|---|---|---|---|---|---|
| 81 | 82 | 83 | 84 | 85 | |

FIG.16
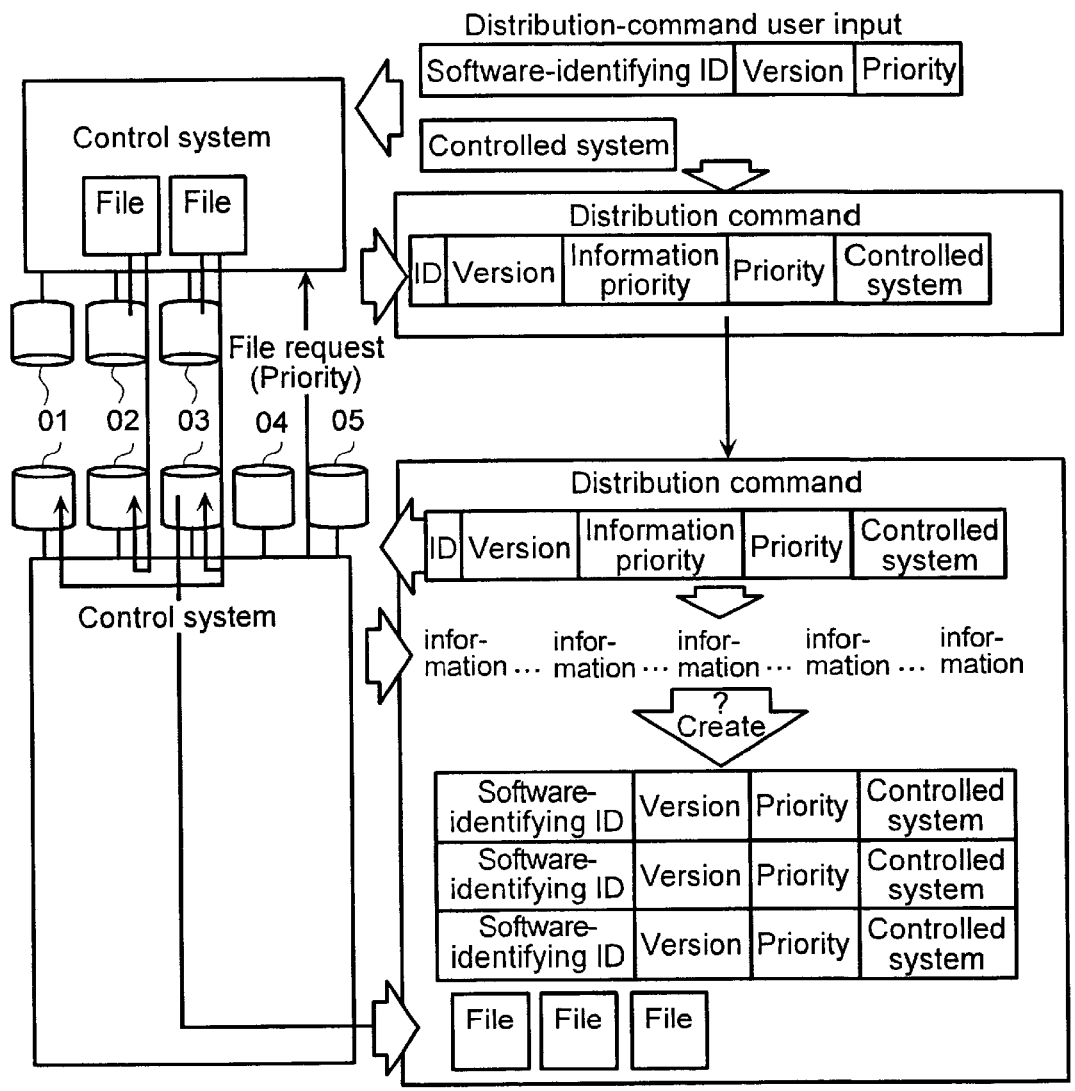
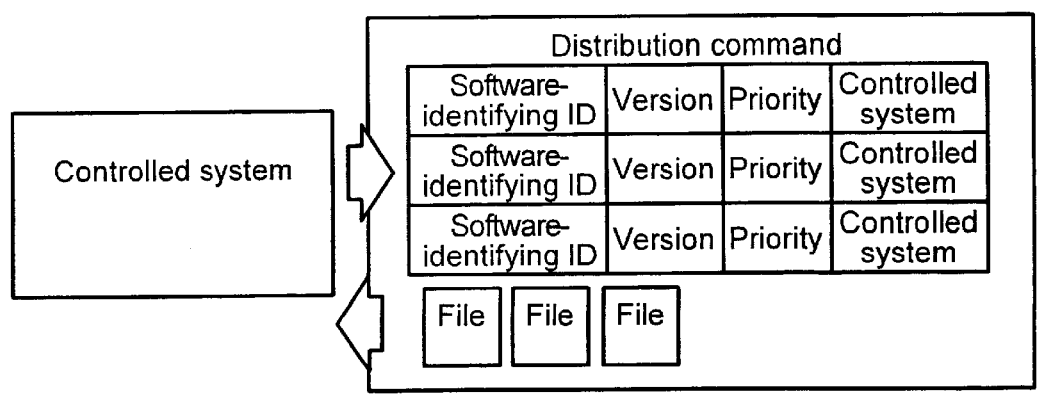

METHOD AND SYSTEM FOR SOFTWARE DISTRIBUTION

CROSS REFERENCE TO RELATED APPLICATION

This application claims priority from Japanese Application No. 11-239173, filed on Aug. 26, 1999.

1. Field of the Invention

The present invention relates to distribution of software such as an application, a program, data, a file and an environment setter.

2. Background of the Invention

There have been proposed and actually implemented a variety of conventional methods for distributing software such as a program and a file to a controlled system. By merely distributing specified software, however, the software may not be usable in the controlled system. In accordance with a conventional technology to solve this problem, before distributing software, a condition is checked. The software is distributed automatically only if the condition is satisfied. Systems adopting this conventional technology are a software-resource distribution & management system disclosed in JP-A-4-175952 and a software automatic distribution & management system described in JP-A-10-301760. In JP-A-7-334436, there is disclosed a software automatic distribution system for distributing necessary software based on a distribution request list created from a dependence relation list of software transmitted from a distributor to a controlled system. There are also a method and an apparatus for installing a plurality of packages classified by package attribute as described in JP-A-10-83280. To be more specific, this method and this apparatus are used for installing only necessary packages selected from a mix of packages.

In the conventional systems, namely, the software-resource distribution & management system disclosed in JP-A-4-175952 and the software automatic distribution & management system described in JP-A-10-301760, if a condition for using software is not satisfied, the software is not distributed. Thus, distribution of unusable software can be avoided. However, there is raised a problem that software cannot be distributed unless the cause of the impossible distribution is removed. This is because whether or not the condition for using software is satisfied is checked automatically, and the distribution of the unusable software is prevented automatically as well.

As a method for solving a problem of inability to distribute software supposed to be distributed, in the software automatic distribution system disclosed in JP-A-7-334436, a dependence relation list provided for each piece of software is transmitted from a software distributor to a controlled system in accordance with a command making a request for software distribution of software made by the controlled system, and pieces of software already existing In the controlled system are eliminated from the list. Then, another request for software distribution of software is transmitted from the controlled system to the software distributor.

In this way, if the controlled system lacks necessary software, the software distributor is capable of automatically distributing the software.

In this conventional method, however, while software relevant to distributed software can be automatically distributed, software required by the relevant software is not taken Into consideration. So that, if a condition for using the relevant software is not satisfied, there will be raised a problem of inability to use the distributed software.

In other words, in the conventional technology, while the distributed software itself works normally, the technology does not consider a case in which third software exists. The third software operates provided that software relevant to the distributed software is distributed over the distributed software. In such a case, since the distributed software itself works normally, there is a problem of a difficulty to determine a cause of inoperative software already installed.

In addition, Japanese Patent Prepublication No. Hei10-83280 disclosing the method and the apparatus for installing a plurality of packages classified by package attribute also describes a method to check required software to be installed prior to installation of the software as a method to automatically install relevant software.

Thereby, the required software can be installed without omission.

In this conventional method, however, the required software is checked at the installation time for missing portions, Thus, the time necessary for checking the required software is added to a time for actual installation of the software to give a total installation time.

Most software being installed cannot be used once the installation is started till the installation is completed or till an OS is restarted.

In Japanese Patent Prepublication No. Hei10-83280, a method of supplying software is not described at all. If the software is assumed to be obtained by adopting an online technique at the checking time, the installation time will further increase. If it is assumed that all pieces of software, which will be very likely required, are supplied by using recording media or adopting an online technique in advance, the installation time can be prevented from increasing. In this case, however, software not actually required is also supplied. Thus, there is raised a problem of wasteful use of the recording medium or the transmission network serving as an online means.

SUMMARY OF THE INVENTION

It is thus an object of the present invention addressing the problems described above to simplify work done by a person in charge of operation management and the user of a controlled system to reduce the number of risks incurred at a software update time and to improve the efficiency of supplying software.

In order to automatically treat software required for using distributed software as an object to be distributed (also referred to hereafter as an object of distribution, an object for distribution or a distribution object), the present invention is provided with a management means for managing software serving as an object of distribution and software required for using the object of distribution by associating the former with the latter.

Examples of the software required for using the object of distribution are an operating system, a run-time library, a driver for making an access to a data base, software required for communication and an OLE protocol. That is to say, the software required for using the object of distribution is premise software of the object of distribution, software components used by the object of distribution or software for presenting the software components.

In addition, setting information and definition information required for execution of software are considered to be required software. Such information includes addresses of a data base to be connected and a directory server, a communication protocol and a proxy.

Required software is checked for each piece of distributed software so that necessary and sufficient software can be used as an object of distribution.

In addition, in order to prevent software already installed in a controlled system from being redistributed in a wasteful distribution of a duplicate of the software, a system for determining software to serve as an object of distribution is provided with a management means for managing already installed software by associating the already installed software with controlled systems. Software to serve as an object of distribution is not distributed if the software is already installed in a controlled system.

Furthermore, in order to prevent already installed software from becoming unusable, there is provided a management means for controlling already installed software and software affected by updating of the already installed software by associating the former with the latter. If software serving as an object of distribution updates the already installed software, other already installed software affected by the updating is checked to make sure that the condition for using software being used remains satisfied.

There is further provided a management means for controlling software usage priorities, which are each set when a distribution is requested, and already Installed software by associating the former with the latter. The usage priority level of software requested to be newly distributed is compared with the usage priority level of already installed software to determine whether the usage condition of the already installed software takes precedence, or the usage condition of the software requested to be newly distributed takes precedence, and to make a decision as to whether to cancel the distribution or to handle the software requested to be newly distributed as an object of distribution.

After the software, which is requested to be newly distributed and then determined to be an object of distribution, is distributed to a distribution target, processing to install the software is carried out.

BRIEF DESCRIPTION OF THE DRAWINGS

Other objects and advantages of the invention will become apparent during the following discussion of the accompanying drawings, wherein:

FIG. 3 is a diagram showing a typical software information file used in the present invention;

FIG. 4 is a diagram showing a typical entry of a table for controlling already cataloged software in a control system;

FIG. 5 is a diagram showing a typical entry of a table for controlling already cataloged software in the control system in the software distribution system provided by the invention;

FIG. 6 is a diagram showing a typical entry of a table for controlling already installed software in a controlled system;

FIG. 7 is a diagram showing a typical entry of a table for controlling software affected by updating of already installed software;

FIG. 8 is a diagram showing a typical entry of a table for controlling premise software of distributed software;

FIG. 9 is a diagram showing a typical entry of a table used for extracting software to serve as an object of distribution;

FIG. 10 is a diagram showing a typical entry of a distribution-command table used in distribution of software;

FIG. 11 is a diagram showing a typical entry of a table used in communicating a result of software installation from a controlled system to a control system;

FIG. 16 is a diagram showing flows of information at premise software checking in a management system between an uppermost-level system and a controlled system;

DESCRIPTION OF THE PREFERRED EMBODIMENT

Figure 1:
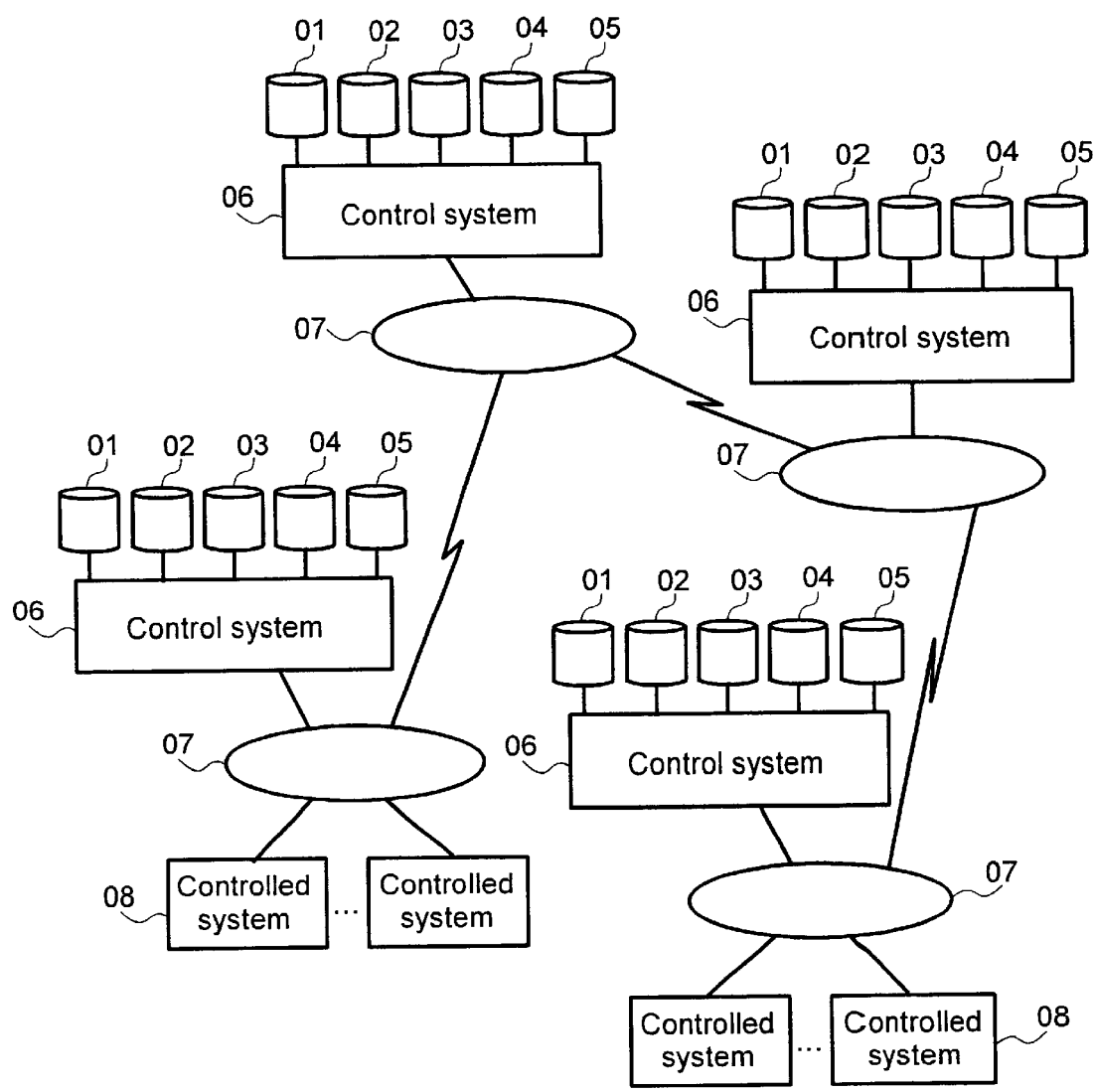
FIG. 1 is a diagram showing the configuration of a software distribution system provided by the present Invention.

A preferred embodiment of the present invention is explained as follows.

The user of a control system (a computer) specifies software to be distributed and a controlled system (a computer) and, then, executes a software distribution command. As an alternative, the user of a controlled system specifies desired software and executes a software distribution command. In this case, software necessary for using the distributed software. Software necessary for distributing the software necessary for using the distributed software and so on, that is, all pieces of software required for the eventual use of the distributed software are checked and all required pieces of software are treated as an object of distribution. At that time, information on an installation order may be distributed as additional data. Such information indicates an order to install the required pieces of software before eventually installing the distributed software. The controlled system receiving the pieces of software from the control system installs them in accordance with the information on an installation order.

It is also possible to control information on already installed software for each controlled system and to exclude already installed software from software to be distributed.

In addition, a post-updating effect of distributed software on already installed software is also taken into consideration. Information on software affected by updating of software is controlled for each already installed software. When an already installed software is updated, whether or not the updating has an effect on already installed software is checked. If a plurality of versions each usable as a candidate for the software to be distributed exist, control is executed to select a version having no effect on already installed software. If software having an effect on other software is updated, control is executed to also distribute a new version of the affected software in order to nullify the effect. As an alternative, the priority level assigned to software to be distributed is compared with the priority level of already installed software to select software with the higher priority level and to determine whether or not to distribute the software to be distributed.

In this embodiment, control systems can also be arranged in a distributed configuration or a multi-stage configuration. In a distributed configuration or a multi-stage configuration comprising a plurality of control systems, a control system cataloging a new piece of software communicates the new piece of software and information on software management to other control systems at the end of the cataloging process so that all the control systems manage the same pieces of software. As an alternative conceivable method, instead of communicating the newly cataloged piece of software, information on the control system cataloging the new piece of software is added to the transmitted information on management, and the new piece of software itself is managed by the control system cataloging the new piece of software.

If software is distributed from a control system to a controlled system by way of another control system (a computer) on the distribution route, what is needed by the other control system is software required for installing the distributed software. Thus, all required software and the distribution-object software can be distributed to the other control system on the distribution route (the computer), or only software lacked by the other control system on the distribution route is distributed thereto. As another alternative, a software information file is distributed to the other control system on the distribution route prior to the software distribution. From the software information file, the other control system on the distribution route determines required but lacked software, and requests the upper-level source control system to download only such software.

In a distributed configuration or a multi-stage configuration comprising a plurality of control systems, information on software installed in a controlled system can be collected and managed by all the control systems or by only the uppermost-level control system in an integrated manner. As an alternative, such information can also be managed by a control system that directly controls the controlled system. As another alternative, the controlled system determines necessary software without communicating such information to any control system, and requests a control system to download the necessary software.

In either case, a controlled system receiving software from a control system installs the software distributed by the control system in accordance with instructions.

A control system may collect information on an environment of a controlled system in its control domain and downloads only software satisfying conditions of the controlled system from an upper-level control system and stores the software. As a conceivable alternative, distribution requested by an upper-level control system is not implemented this method is effective, for example, for a case in which all controlled systems in the control domain of a control system operate under a common OS and only software supporting the OS is managed.

As another conceivable alternative method, necessary software and software to be distributed are cataloged in advance as a combined package and these pieces of software are managed in the control system as a package. As a further alternative, these pieces of premise software may be stored in a medium to be distributed to a controlled system, which can then install the software from the medium.

The embodiment is described in more detail by referring to the diagrams as follows.

FIG. 1 is a diagram showing the configuration of a software distribution system provided by the present invention. In the description of the embodiment of the present invention, a system providing software is referred to as a control system and a system serving as a recipient of the software is called a controlled system. As shown in FIG. 1, a plurality of control systems can be put in a distributed configuration or a multi-stage/multi-layer configuration.

In addition, in the configuration shown in FIG. 1, all systems are connected to each other by a network. It should be noted, however, that the present invention can also be applied to a case in which software serving as an object of distribution is distributed by using a recording medium. Thus, it is also possible to think a case in which a control system is not connected to a controlled system by a network.

Figure 2:
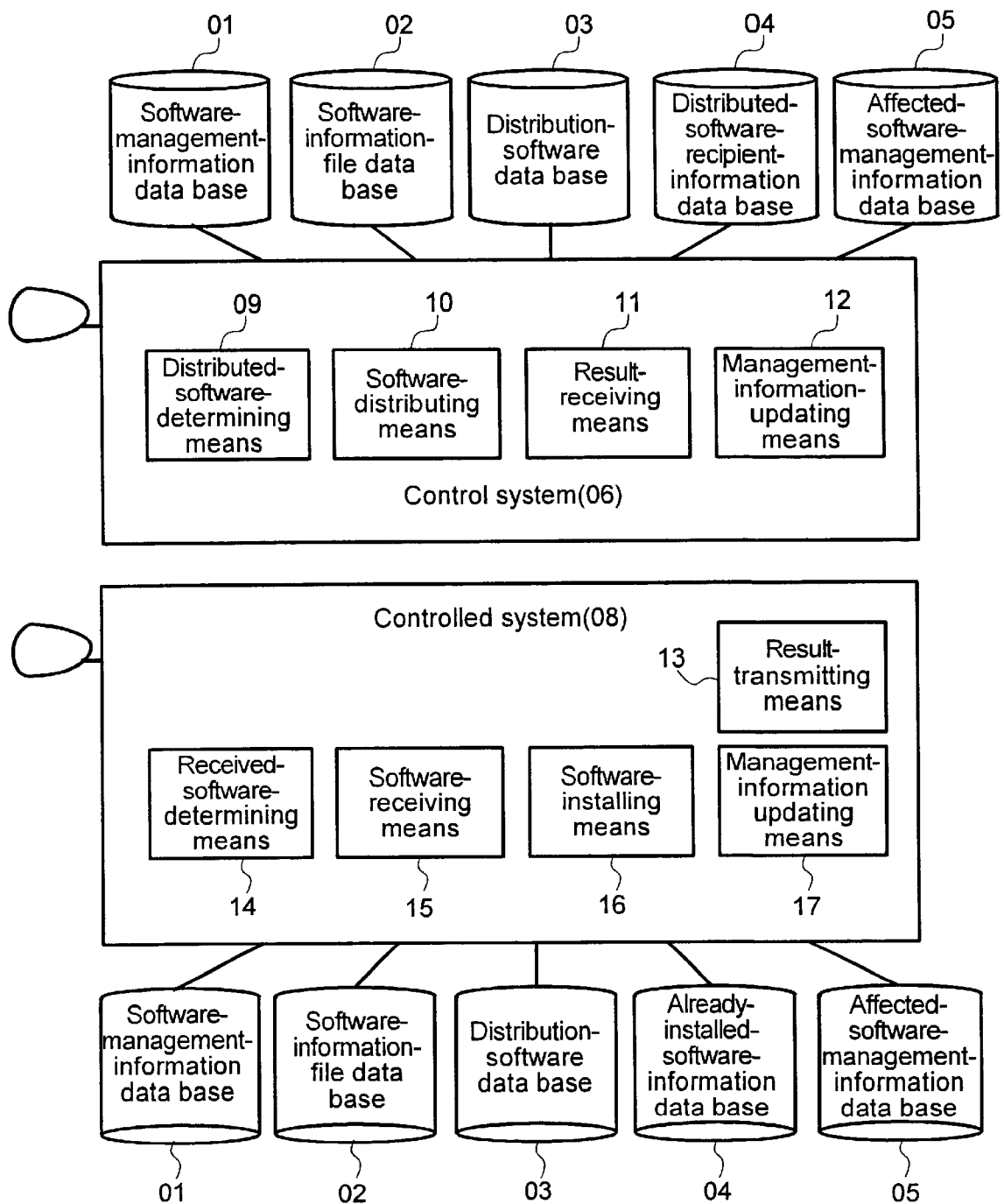
FIG. 2 is a diagram showing a configuration of programs of a control system and a controlled system.

FIG. 2 is a diagram showing a configuration of programs for implementing the present invention.

As shown in the figure, a control system 06 has a distribution-software memory means 03 for storing software to be distributed, a software-management-information memory means 01 and a software-information-file memory means 02 for storing a software information file defining information relevant,to software to be distributed.

In addition, one of the control systems 06 including a control system serving a distribution intermediate and a controlled system 08 are provided with a distributed-software-recipient-information memory means 04 for storing information on already installed software, an affected-software-management-information memory means 05 for storing information on software affected by updating of installed software for each piece of already installed software and distributed-software-determining means 09 and 14 each used for determining software to be distributed in accordance with a distribution command from these pieces of information. It should be noted that the distributed-software-recipient-information memory means 04 provided in a controlled system 08 is referred to as an already-installed-software-information memory means 04.

A software-distributing means 10 employed in a control system 06 distributes software determined to be an object of distribution and a software-receiving means 15 employed in a controlled means 08 receives the distributed software to be installed by a software-installing means 16 employed in the controlled means 08.

A control system 06 may control information on already installed software and information on software affected by updating of installed software. In this case, a result-transmitting means 13 employed in the controlled system 08 transmits these pieces of information to the control system 06.

A control system serving as a distribution intermediate between a source control system and another control system or a controlled system has at least a means for receiving software and a software information file from an upper-level control system. It should be noted that such a distribution intermediate is not shown in the figure.

A system determining software to be distributed has a management-information updating means 12 or 17 for updating information on already installed software controlled thereby and information on affected software.

FIG. 3 is a diagram showing a typical software information file used in the present invention. A software information file is stored in the software-information-file data base 02 shown in FIG. 2. Information defined in the software information file can be used as a basis for creating software management information shown in FIG. 4 an affected-software table shown in FIG. 7 and a premise-software table shown in FIG. 8.

A software information file may be attached to software written by a software developer or created by a person in charge of software management by defining similar data. As an alternative, an information file made by a third party can be acquired and used as a software information file. As another alternative, the person in charge of software management may have a software information file generated automatically by utilization of data set by using a GUI or a command.

FIG. 4 is a diagram showing a typical entry of a table for controlling already cataloged software in a control system. This table is stored in the software-management-information data base 01. By examining the table, it is possible to know which pieces of software are cataloged in the control system. As shown in the figure, the entry comprises pieces of information on a software-identifying ID 11 for identifying a cataloged piece of software or for uniquely identifying the piece of software, a software name 12 such as a product name, a version 13, a software information file name 14, that is, the name of the corresponding software information file stored in the software-information-file data base 02 shown in FIG. 2 and a software file name 15, that is, the name of a file of the piece of software itself stored in the distribution-software data base 03 shown in FIG. 2. In order to make the software management simple, a piece of software to be distributed is stored in a file. If software to be distributed is stored in a plurality of files, the names of the files are arranged in a row.

The term software used in this specification also implies a program, data, a file, definition information and firmware of a driver or the like.

FIG. 5 is a diagram showing a typical entry of a system-cataloged-software management table for controlling already cataloged software in a distributed configuration wherein software is controlled by a plurality of control systems. As shown in FIG. 5, the entry also includes information 26 on a control system controlling the piece of software in addition to the pieces of information composing the entry shown in FIG. 4. By referring to an entry of the table shown in FIG. 5, it is possible to know which control system controls a piece of software.

FIG. 6 is a diagram showing a typical entry of a table for controlling already installed software in a controlled system. This already-installed-software management table may be stored in the distributed-software-recipient-information data base 04 employed in a control system 06 shown in FIG. 2 or the already-installed-software-information data base 04 employed in a controlled system 08 also shown in FIG. 2. From this already-installed-software management table, it is possible to know which pieces of software have already been installed in controlled systems when determining software to be distributed. As shown in FIG. 6, the entry comprises pieces of information on a software-identifying ID 31, a version 32 and a priority level 33. The priority level 33 is compared with the priority level of software requested for distribution to determine whether or not to distribute the requested software. A control system can have an already-installed-software management table for each controlled system or, in order to reduce the checking-process load, a control system has only an already-installed-software management table common to all controlled systems wherein each entry of this table is associated with controlled systems completing installation of the piece of software represented by the entry.

FIG. 7 is a diagram showing a typical entry of a table for controlling software affected by updating of already installed software. This affected-software management table is stored in the affected-software-management-information data base 05 shown in FIG. 2. An entry of this affected-software management table is provided for each software management unit, which comprises a software-identifying ID 41 and a version 42 as shown in FIG. 7. By referring to this affected-software management table, it is possible to know software and its version, which are affected when software is updated.

Thus, each entry of this affected-software management table comprises a software-identifying ID 41 and a version 42.

FIG. 8 is a diagram showing a typical entry of a table for controlling premise software of distributed software. This entry includes information extracted from the contents of a software information file shown in FIG. 3, that is, only selected information on software required for using the software associated with the software information file. As shown in the figure, each entry of this premise software management table comprises a software-identifying ID 51, a low-limit version 52 and a high-limit version 53.

In actual processing, the software information file is analyzed for each software distribution to determine premise software of the distributed software, or a premise-software management table is created when the software information file is analyzed to allow premise software to be controlled by using the premise-software management table. By referring to the premise-software management table, it is possible to know which other software is required for distribution of specific software.

In the case of the embodiment, this file can be generated from software requested for distribution in order to make the processing simple.

FIG. 9 is a diagram showing a typical entry of a table used for extracting software to serve as an object of distribution. This entry is set from the already-installed-software management information shown in FIG. 6, the affected-software management information shown in FIG. 7 and the premise-software management information shown in FIG. 8. As shown in FIG. 9, the entry comprises a software-identifying ID 62, a low-limit version 63 and a high-limit version 64. A candidate number 61 is used when there is a plurality of candidates for the software to be distributed. If there is only 1 candidate, the candidate number 61 is set at 0. If there is a plurality of candidates, the candidate number 61 is ascending numbers starting from 1. If any of candidate further comprises of a plurality candidates in a hierarchy of candidates, a lower digit of the candidate number 61 is used for specifying one of selection alternatives for a candidate indicated by the candidate number 61. The following candidate numbers are an example of an application in a hierarchy of candidates:

| Candidate No. | Software | Version No. | Description |
| --- | --- | --- | --- |
| 0 | Software A | Version 5 | Required software |
| 1 | Software B | Version 2 | Required first candidate |
| 11 | Software C | Version 1 | First selection alternative of first candidate |
| 11 | Software D | Version 1 | First selection alternative of first candidate |
| 12 | Software C | Version 2 | Second selection alternative of first candidate |
| 12 | Software D | Version 1 | Second selection alternative of first candidate |
| 2 | Software B | Version 3 | Required second candidate |
| 2 | Software C | Version 3 | Required second candidate |

FIG. 10 is a diagram showing a typical entry of a distribution-command table used in distribution of software.

As shown in the figure, this entry comprises an array of pieces of information included in the entries described previously. The entry includes at least a software-identifying ID 71 or a software name, a version 72 and a controlled system 75.

FIG. 11 is a diagram showing a typical entry of a table in communicating a result of software installation from a rolled system to a control system. In a software distribution system wherein distributed software is determined controlled system, it is not necessary to communicate a result of software installation from the controlled system to the control system since the control system may assume that the distributed software is indeed installed in the controlled system anyway. It is also possible to adopt a method whereby information on already installed software is collected from a controlled system. As shown in FIG. 11, the entry of the table includes at least a software-identifying ID 81 or a software name, a version 82 and a controlled system 85. A result of software installation is used as a basis for updating management information of already installed software and management information of affected software.

Figure 12:
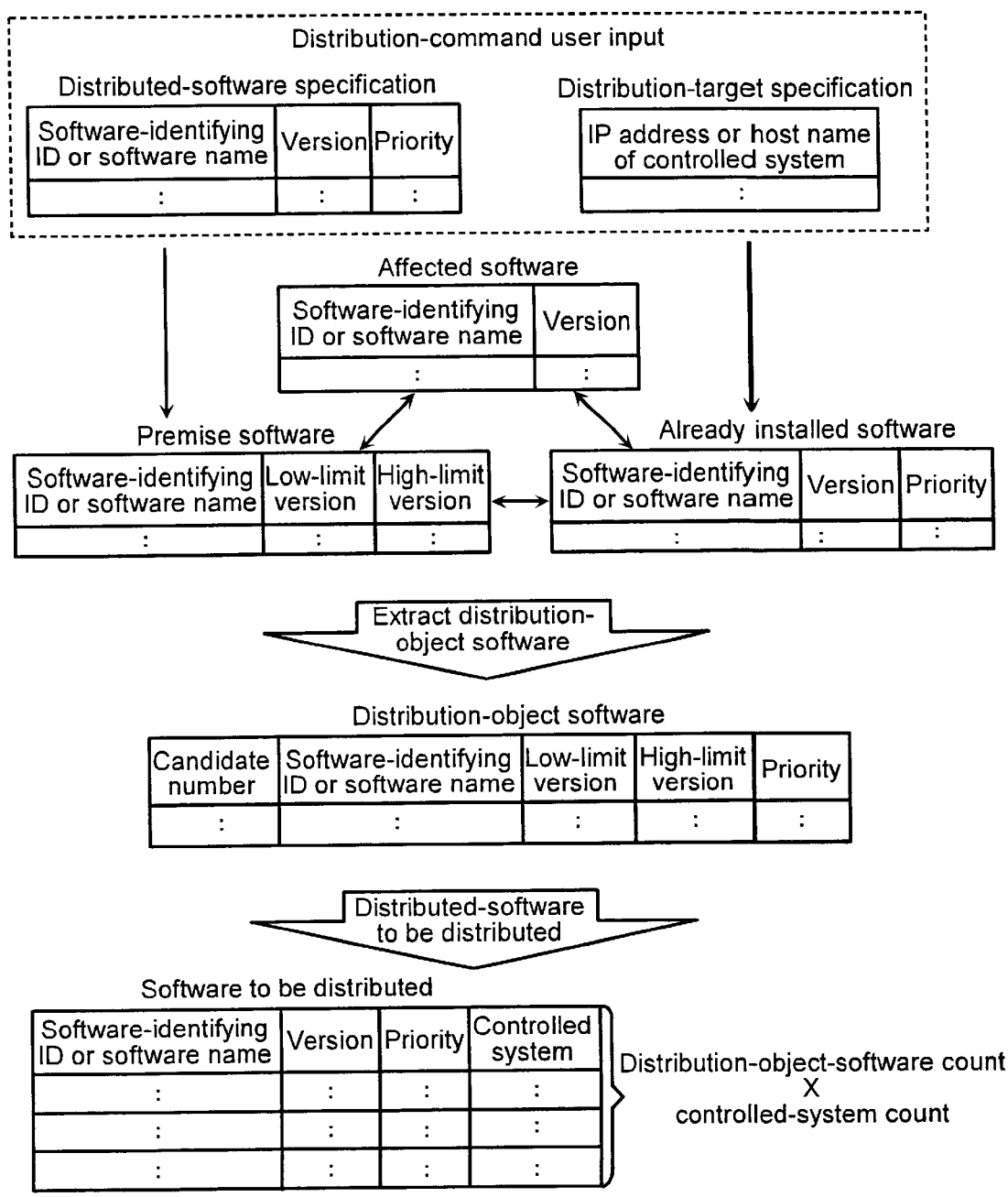
FIG. 12 is a diagram showing relations between table entries referred to and generated during a period of time between reception of a command making a request for software distribution of software and determination of the software to be distributed.

FIG. 12 is a diagram showing relations between table entries referred to and generated during a period of time between reception of a command making a request for software distribution of software and determination of the software to be distributed.

When the user enters information on software to be distributed including a software-identifying ID or a software name as well as a version and, if necessary, information specifying a priority level and the IP address of a controlled system serving as a recipient of the software or a host name, an entry of premise software shown in FIG. 8 is generated from the information on the software, and the specified information on the controlled system is used for referencing information on already installed software shown in FIG. 6. The referenced information on already installed software is used for referencing information on affected software shown in FIG. 7 and entries of the table used for extracting software to serve as an object of distribution shown in FIG. 9 is generated from these pieces of referenced information.

Software to be distributed is then determined from a plurality of candidates and a command is issued to distribute the software to the controlled system.

Figure 13:
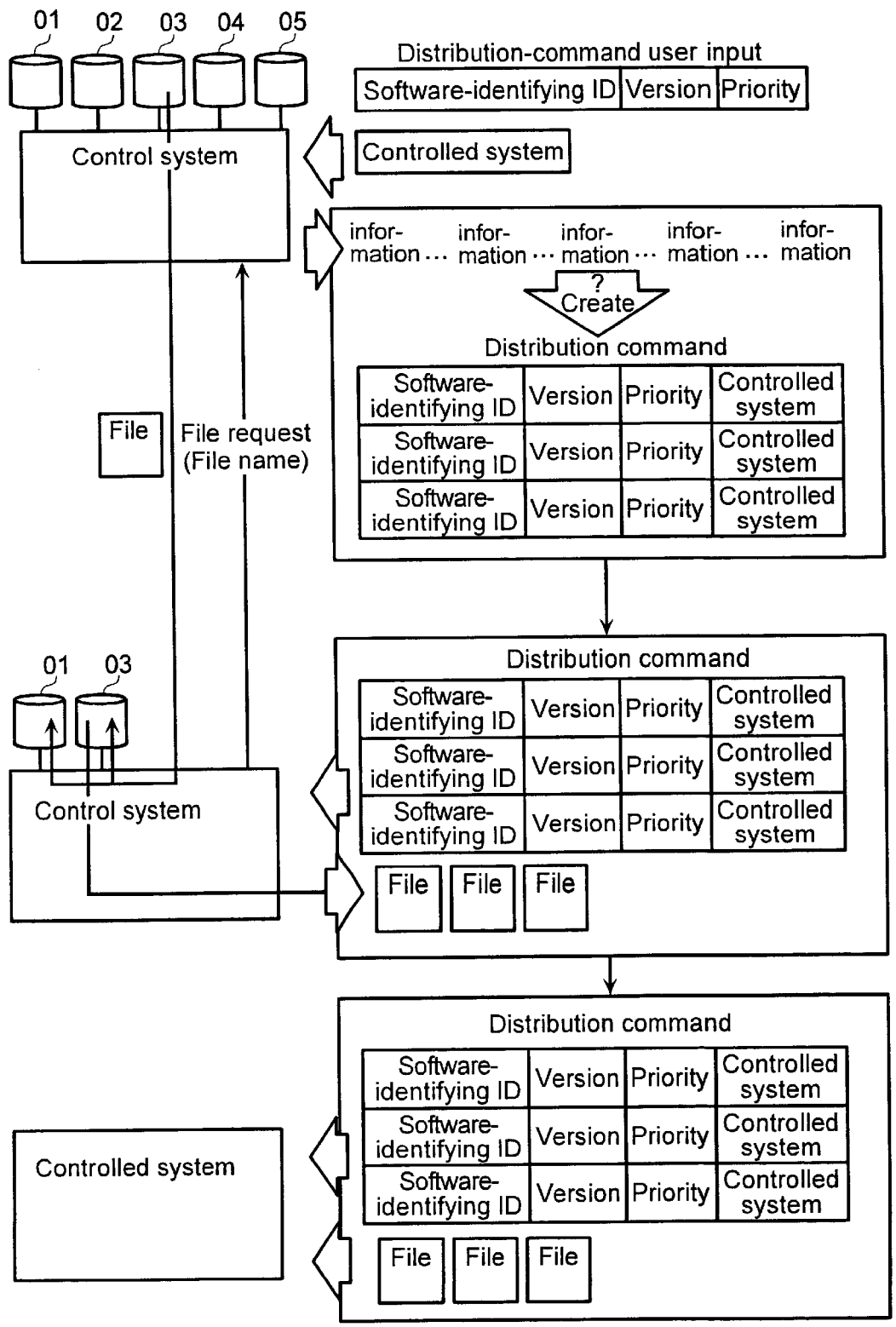
FIG. 13 is a diagram showing flows of information at premise software checking in an uppermost-level system.

FIG. 13 is a diagram showing flows of information in determination of software to be distributed upon reception of a command making a request for software distribution in an uppermost-level system. As shown in the figure, the user enters a software-identifying ID (or a software name), a version of software to be distributed and information on a controlled system or information specifying a distribution target to the uppermost-level system. A plurality of pieces of software to be distributed and a plurality of destination targets may be entered.

As the user enters a distribution command, management information is retrieved from management data bases to determine software to be distributed. A command making a request for software distribution is then created and issued to a lower-level system. Receiving the command making a request for software distribution, the lower-level system checks whether or not the desired software file exists in a management data base. If the desired software file does not exist in a management data base, the file is downloaded from the upper-level system.

If the lower-level system is a control system, only a command making a request for software distribution is transmitted thereto from the upper-level system. In this example, the lower-level system is a controlled system. Thus, a distributed file is also transmitted thereto along with the distribution information.

Receiving the command making a request for software distribution and a distributed file, the controlled system installs the software in accordance with the instruction.

Figure 14:
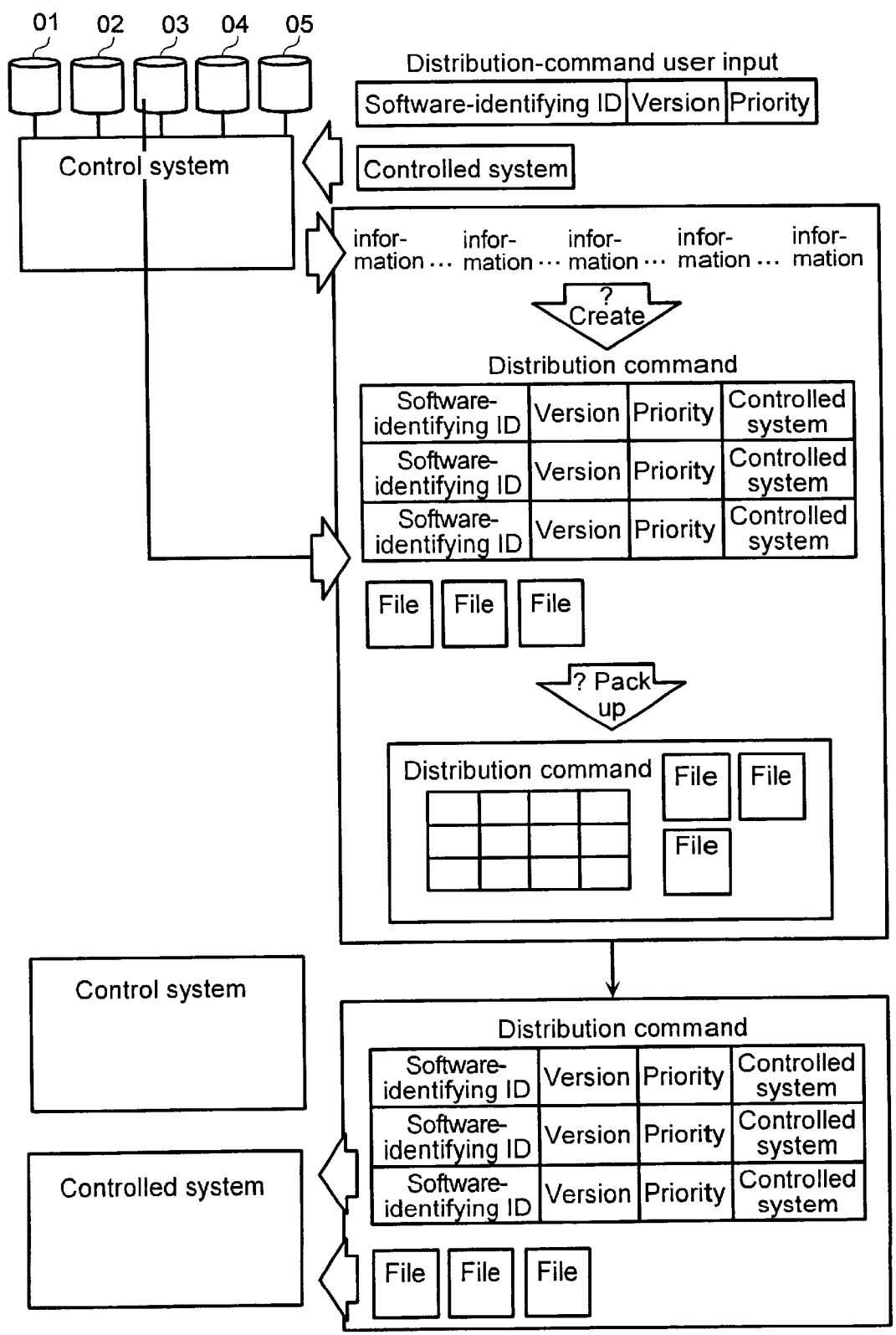
FIG. 14 is a diagram showing flows of Information at premise software checking in an uppermost-level system.

FIG. 14 is a diagram showing an image of distributing software determined by an uppermost-level system for distribution and a command making a request for software distribution, which are stored in a file. Even if the software and the command making a request for software distribution are distributed by way of a management server, the file for storing the software and the command making a request for software distribution is transmitted to a lower-level system with the state of the file kept as it is.

Receiving the distributed file including the command making a request for software distribution, the controlled system installs the software stored in the file in accordance with the instruction.

Figure 15:
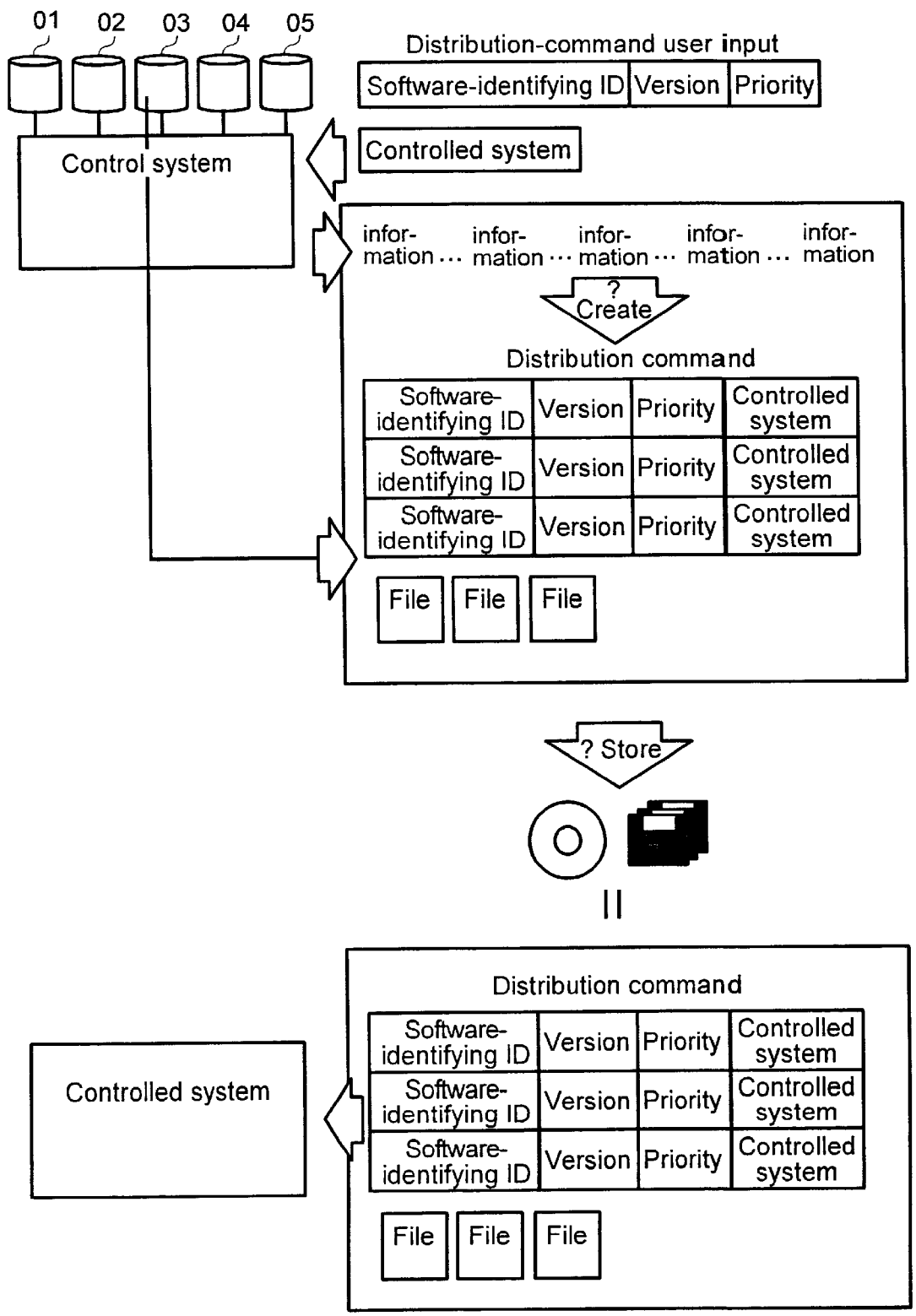
FIG. 15 is a diagram showing flows of information at premise software checking in an uppermost-level system.

FIG. 15 is a diagram showing an image of distributing software determined by an uppermost-level system for distribution and a command making a request for software distribution, which are stored in a recording medium.

FIG. 16 is a diagram showing flows of data in determination of software to be distributed upon reception of a command making a request for software distribution in an intermediate control system.

The uppermost-level control system creates a software-identifying ID, a version and information on a controlled system in a simple combination and generates a command making a request for software distribution. Receiving the command making a request for software distribution from the uppermost-level control system, the intermediate control system checks whether or not the desired software file exists in a management data base. If the desired software file does not exist in a management data base, the file is downloaded from the upper-level system. Then, management information is retrieved from a management data base to determine software to be distributed. A command making a command making a request for software distribution is created and transmitted to a lower-level system along with the software to be distributed.

If the lower-level system is a control system only a command making a request for software distribution is transmitted thereto from the upper-level system. In this example, the lower-level system is a controlled system. Thus, a distributed file is also transmitted thereto along with the distribution information.

Receiving the command making a request for software distribution and distributed file, the controlled system installs the software In accordance with the command.

Figure 17:
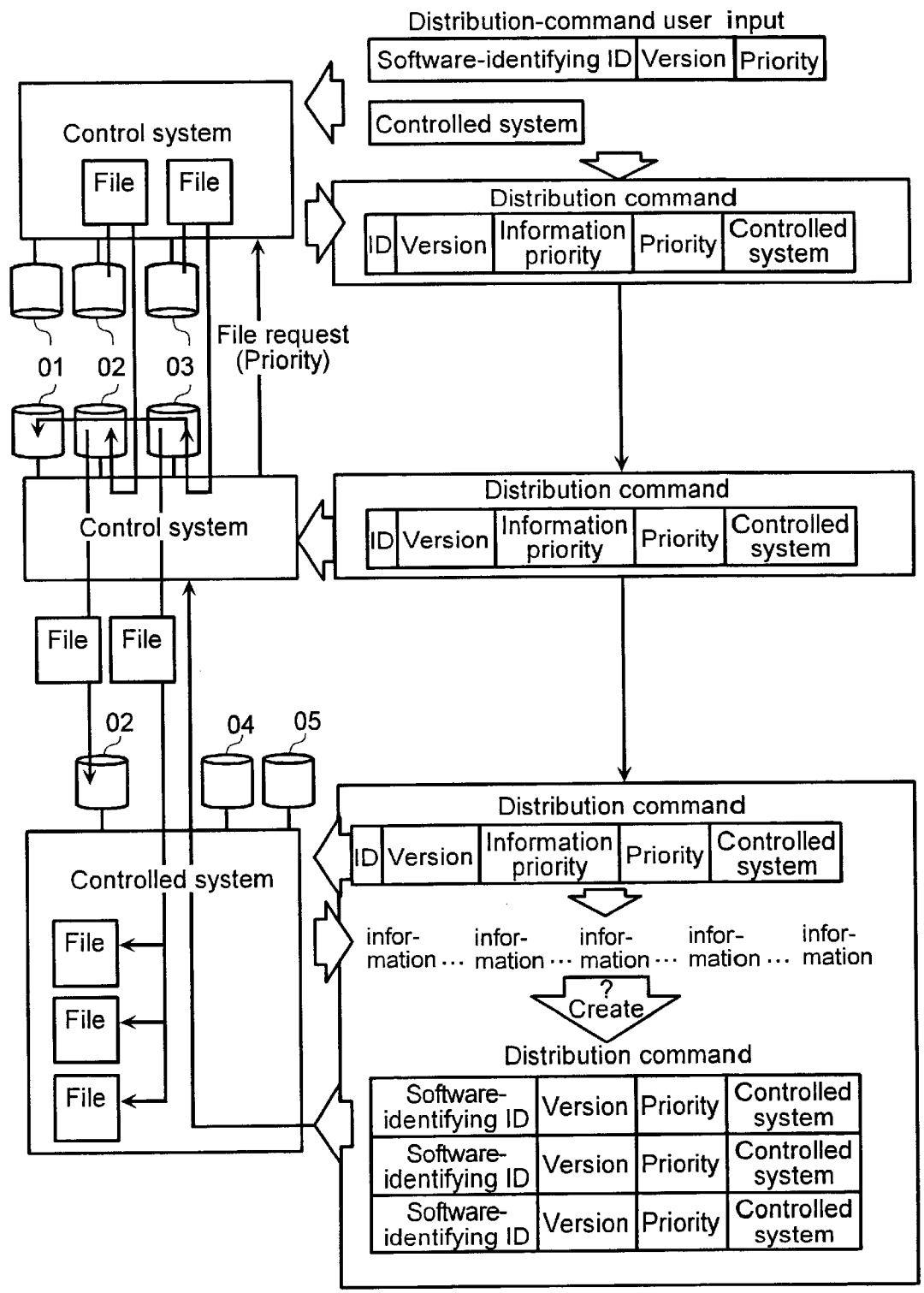
FIG. 17 is a diagram showing flows of information at premise software checking in a controlled system.

FIG. 17 is a diagram showing flows of information in determination of software to be distributed in a controlled system upon reception of a command making a request for software distribution from an upper-level system or upon reception of a command making a request for software distribution from the user of the controlled system.

Receiving the command making a request for software distribution from the uppermost-level control system, the controlled system checks whether or not the desired software file exists in a management data base. If the desired software file does not exist in a management data base, the file is downloaded from the upper-level system. If the desired software file also does not exist in a management data base of the upper-level data base, the file is downloaded from the uppermost-level system.

The controlled system retrieves management information to determine desired software. Then, the file of the desired software is downloaded from the upper-level system and the desired software is installed.

FIGS. 18, 19, 20 and 21 each show a flowchart of a function for determining software to serve as an object of distribution.

Figure 18:
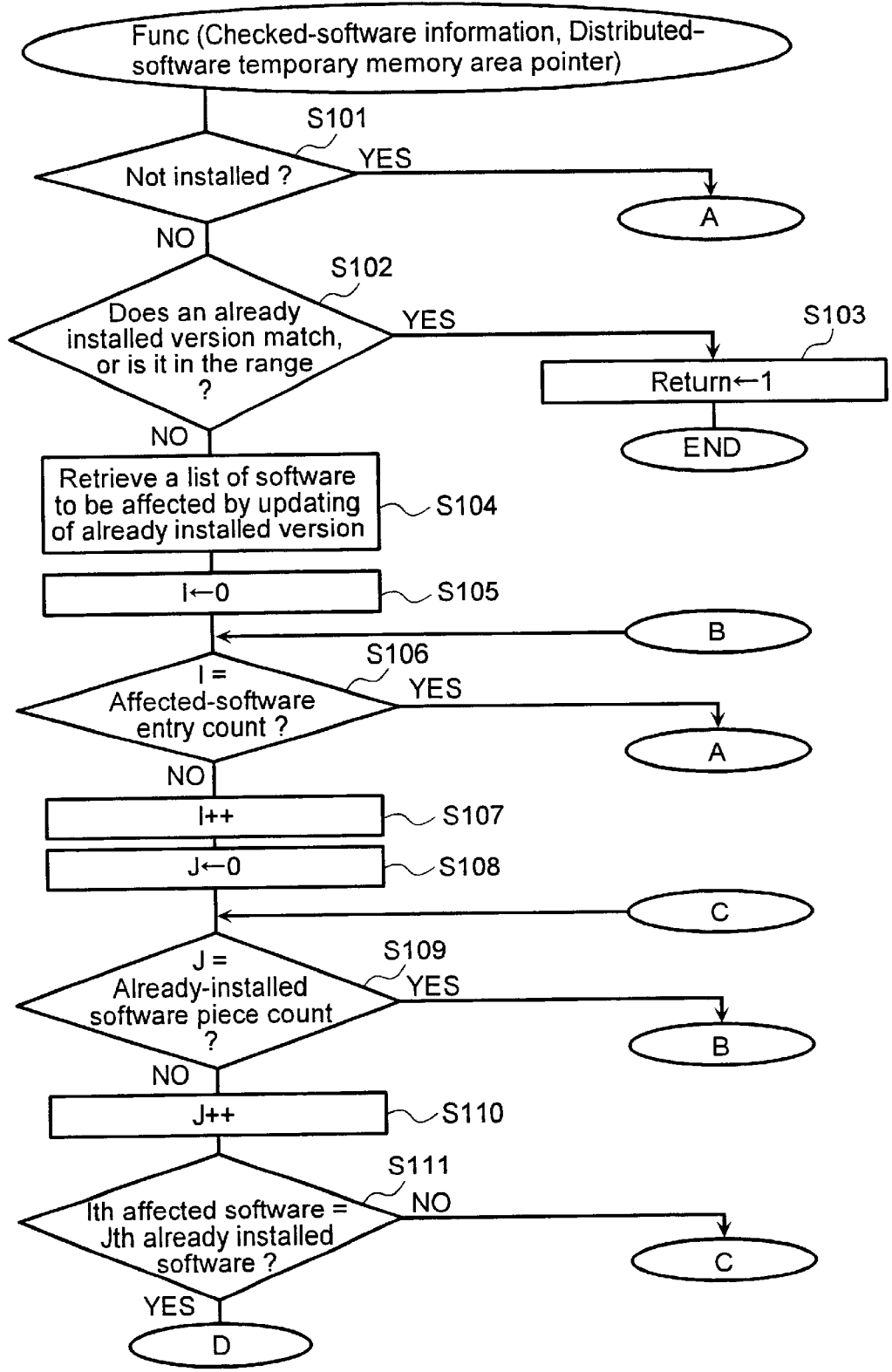
FIG. 18 shows a flowchart of a function for determining software to serve as an object of distribution.

The flowchart shown in FIG. 18 begins with a step S101 to determine whether checked software has not been installed in the distribution target. If the result of the determination is YES, that is, if the checked software has not been installed in the distribution target, required software is checked and made an object of distribution in processing to be described later by referring to a flowchart shown in FIG. 21.

If the result of the determination at the step S101 is NO, on the other hand, the flow of the processing goes on to a step S102 to determine whether the checked software is the correct version of the software installed in the distribution target. If the result of the determination is YES, that is, if the checked software is the correct version of the software installed in the distribution target, the flow of the processing goes on to a step S103 to return a value of 1 and end the processing.

If the result of the determination at the step S102 is NO, that is, if the checked software is not the correct version of the software installed in the distribution target, on the other hand, the flow of the processing goes on to a step S104 to obtain a list of pieces of software to be affected by updating of the version of the software installed in the distribution target. Then, pieces of processing are carried out at steps S105 to S111 to compare the list of pieces of software to be affected by updating of the version of the software installed in the distribution target with a list of pieces of software already installed in the distribution target. If the result of the determination of the step S109 is YES or if the result of the determination of the step S111 is NO, the list comparison is continued. If none on the former list matches a piece of software in the latter list or if none of the already installed software will be affected, that is if the result of the determination of the step S106 is YES, on the other hand, required software is checked and made an object of distribution in processing to be described later by referring to a flowchart shown in FIG. 21 as is the case of the YES result of the step S101.

Figure 19:
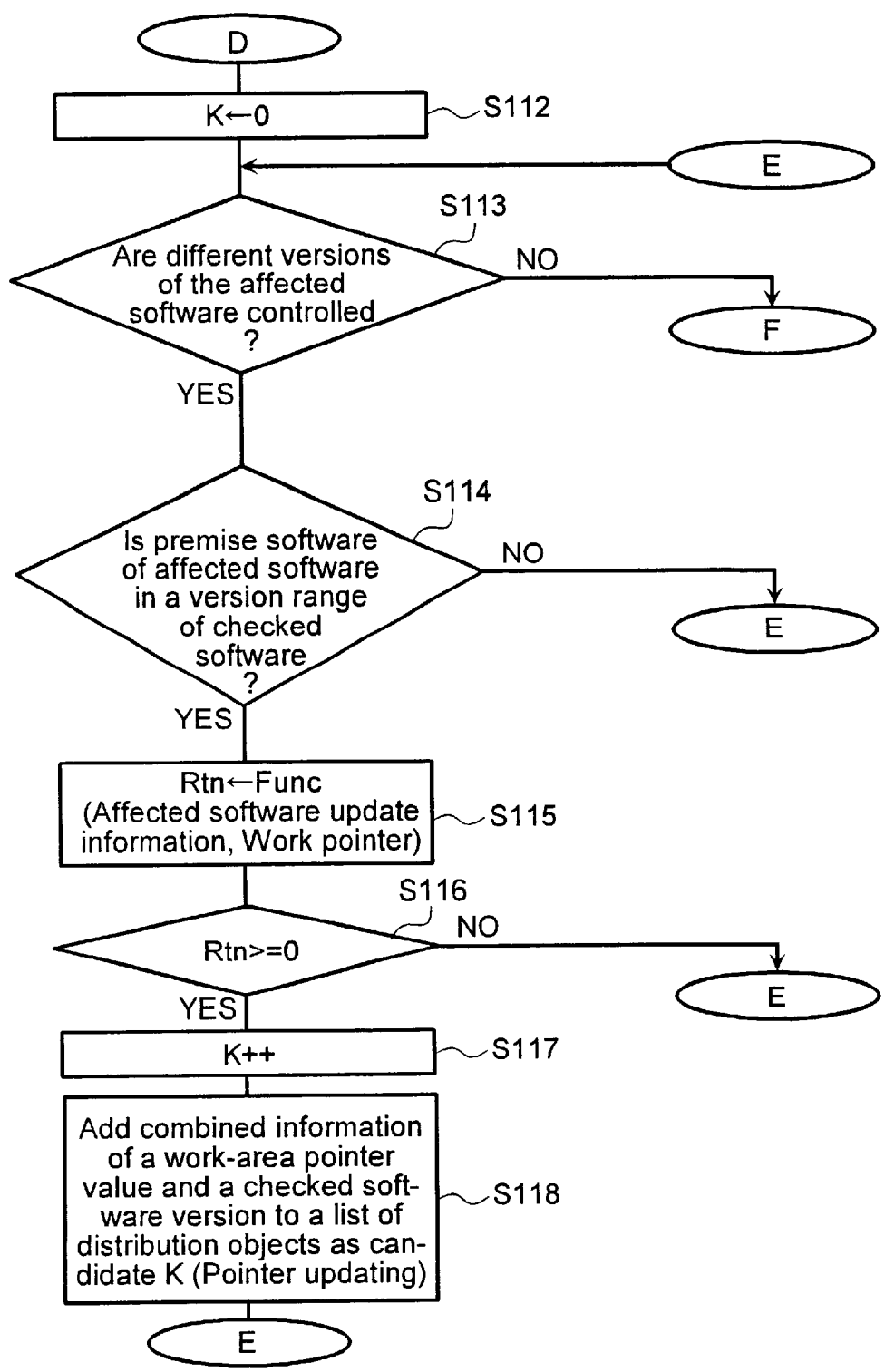
FIG. 19 shows a flowchart of a function for determining software to serve as an object of distribution.
Figure 20:
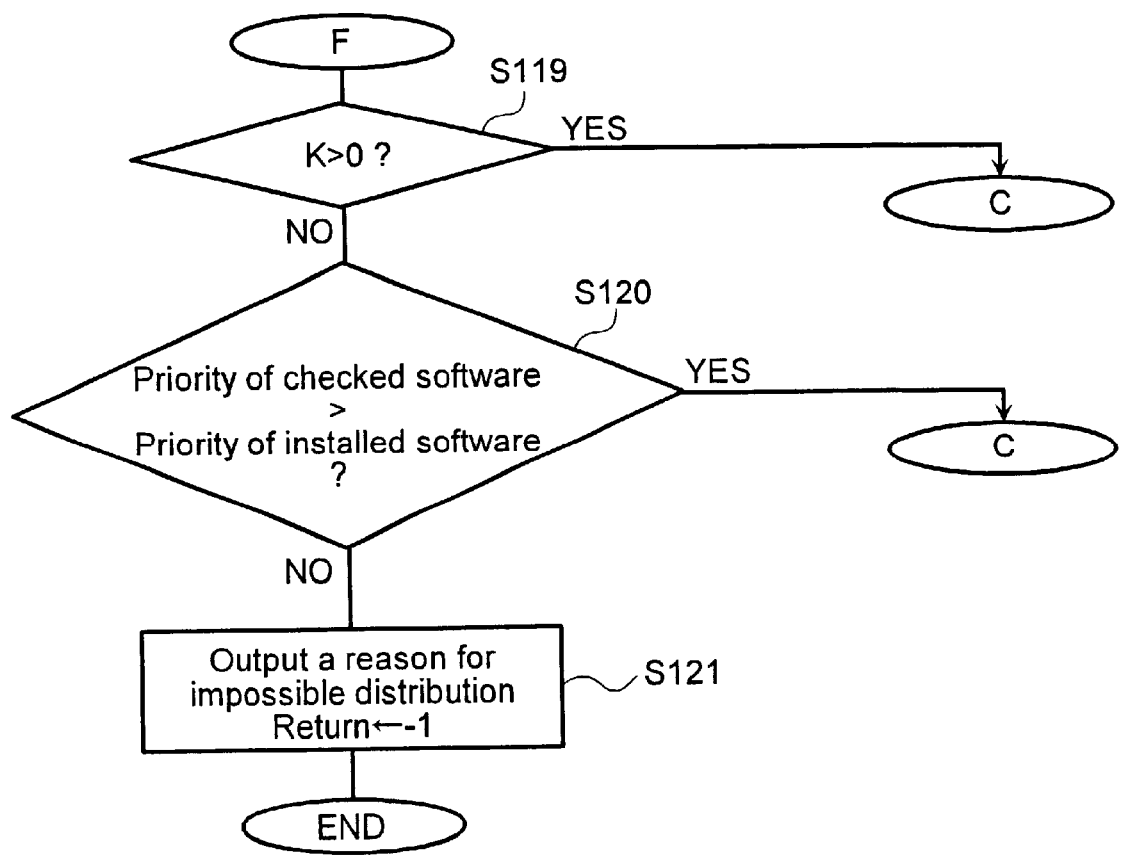
FIG. 20 shows a flowchart of a function for determining software to serve as an object of distribution.

If a piece of software on the former list matches a piece of software in the latter list or if a piece of already installed software will be affected, that is, if the result of the determination of the step S111 is YES, on the other hand, the flow of the processing goes on to a step S112 of the flowchart shown in FIG. 19 at which K is initialized at 0. Then the flow of the processing goes on to the next step S113 to examine whether a different version of the affected software exists. If a different version exists, that is, if the result of the determination at the step S113 is YES, the flow of the processing goes on to a step S114 to compare the range of versions of premise software of software to be affected by the different version with the range of versions of checked software.

If no version in the former range of versions matches a version in the latter range of versions, that is if the result of the determination at the step S114 is NO, the flow of the processing goes back to the step S113 to examine whether another different version of the affected software exists.

If a version in the former range of versions matches a version in the latter version, that is, if the result of the determination at the step S114 is YES, on the other hand, the flow of the processing goes on to a step S115 to recursively call the function represented by the flowchart shown in FIG. 19 to process the matching version in the same way as handling a matching piece of software found at the step S111 described earlier.

At the next step S116, a return value from the function is examined. If the return value is negative, that is, if the outcome of the examination at the step S116 is NO, the flow of the processing goes back to the step S113 to examine whether another different version of the affected software exists.

If the return value is positive, that is, if the outcome of the examination at the step S116 is YES, on the other hand, the flow of the processing goes on to a step S118 by way of a step S117 at which the value of K is incremented. At the step S118, information representing a combination of a work-area pointer, the updated version and the version of software to be checked is added to a list of objects to be distributed as a new candidate. The work-area pointer is a pointer updated by an operation referred to as pointer updating. That is, the new candidate is added to the beginning of candidates already cataloged on the list as a candidate corresponding to K. Then, the flow of the processing goes back to the step S113 to examine whether another different version of the affected software exists.

If the result of the determination at the step S113 is NO, that is, if no different version exists, on the other hand, the flow of the processing goes on to a step S119 to examine the value of K. If the value of K is found equal to 0 or the result of the examination at the step S119 is NO, that is, if there is no newly added candidate, the flow of the processing goes on to a step S120 to compare the priority level of the software to be checked with the priority level of the already installed software. If the priority level of the software to be checked is found higher than the priority level of the already installed software, that is, if the result of the comparison at the step S120 is YES, the affected software is ignored and the list-comparison processing described above is continued by going back to the step S109. If the priority level of the software to be checked is found equal to or lower than the priority level of the already installed software, that is if the result of the comparison at the step S120 is NO, on the other hand, the flow of the processing goes on to a step S121 at which a reason for the impossible distribution is generated as a standard output or as a log. Then, the distribution processing is terminated.

If the value of K is found greater than 0 or the result of the examination at the step S119 is YES, that is, if there is a newly added candidate, on the other hand, the list-comparison processing described above is continued by going back to the step S109.

Figure 21:
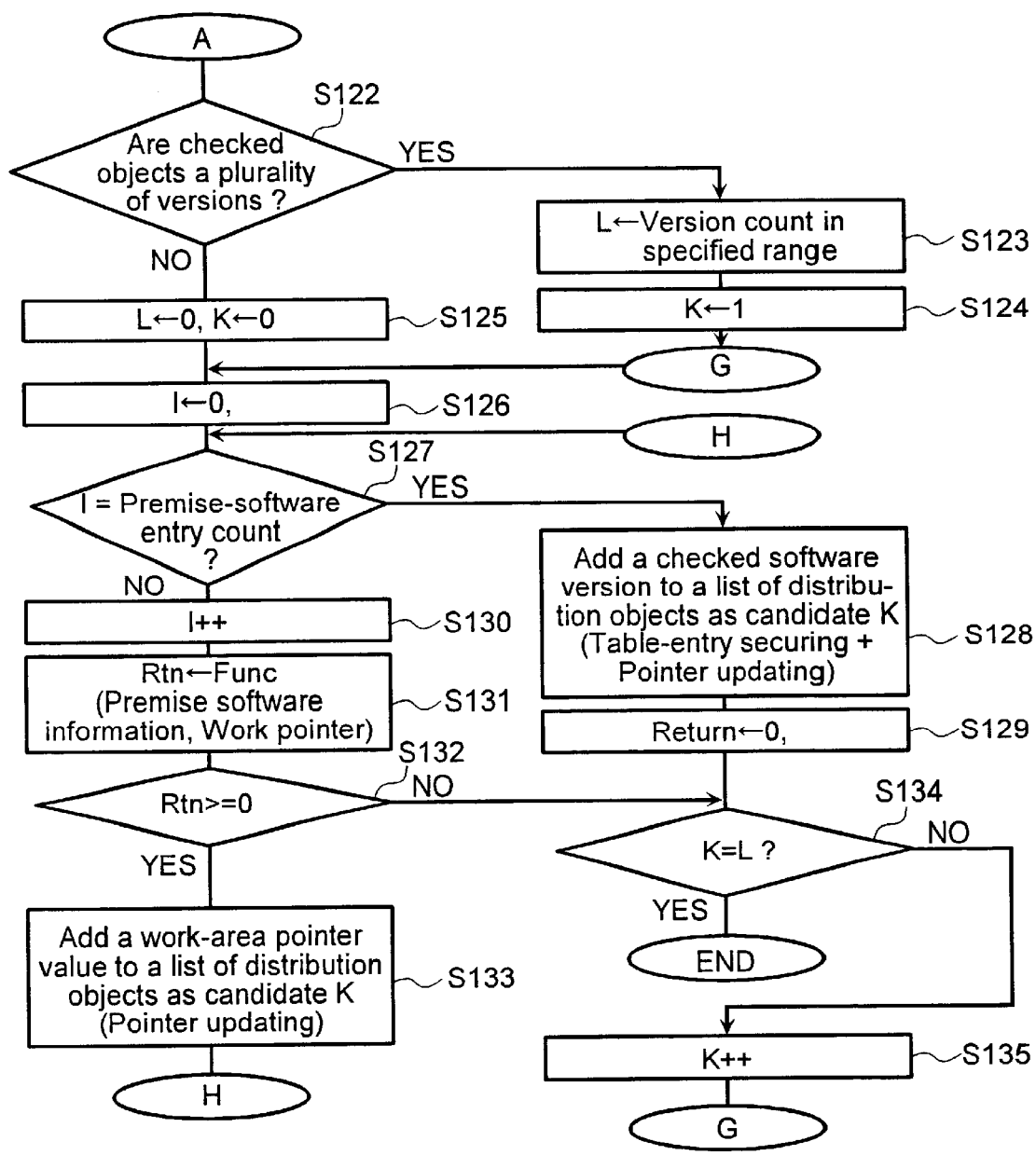
FIG. 21 shows a flowchart of a function for determining software to serve as an object of distribution.

If the result of the determination of the step S101 is YES, that is, if the checked software has not been installed in the distribution target, or if none of the already installed software will be affected by installation of the distributed software, that is, if the result of the determination of the step S106 is YES, on the other hand, required software is checked and made an object of distribution in processing represented by a flowchart shown in FIG. 21.

As shown in FIG. 21, the flowchart begins with a step S122 to determine whether the checked software includes a specified range of versions. If the result of the determination at the step S122 is YES, that is, if the checked software includes a specified range of versions, the flow of the processing goes on to a step S123 at which each of the versions is checked.

If premise software exists, that is, if the number of pieces of premise software is greater than I, which was set at 0 at a step S126, or if the result of determination at the step S127 is NO, the flow of the processing goes on to a step S130 to increment I. Then, the function represented by the flowchart shown in FIG. 21 is recursively called at the next step S131 with information on the premise software used as an argument.

At the next step S132, a return value received from the function is examined. If the return value is found negative, that is, if the result of the examination at the step S132 is NO, the processing is continued by not taking the premise software of the software being checked as an object of distribution so that the premise software does not affect the existing environment.

If the return value is found positive, that is, if the result of the examination at the step S132 is YES, on the other hand, the flow of the processing goes on to a step S133 at which a work-area pointer is added as a new candidate to a list of objects to be distributed (pointer updating). That is, the new candidate is added to the beginning of candidates already cataloged on the list as a candidate corresponding to K.

If premise software does not exist or checking of all pieces of premise software is completed, that is, if the result of the determination at the step S127 is YES, on the other hand, the flow of the processing goes on to a step S128 at which a version of the checked software is added as a new candidate to the list of objects to be distributed (list-area securing and pointer updating). That is, the new candidate is added to the beginning of candidates already cataloged on the list as a candidate corresponding to K.

As checking of all pieces of software is completed as indicated by a YES result of determination at a step S134, the processing is ended.

Figure 22:
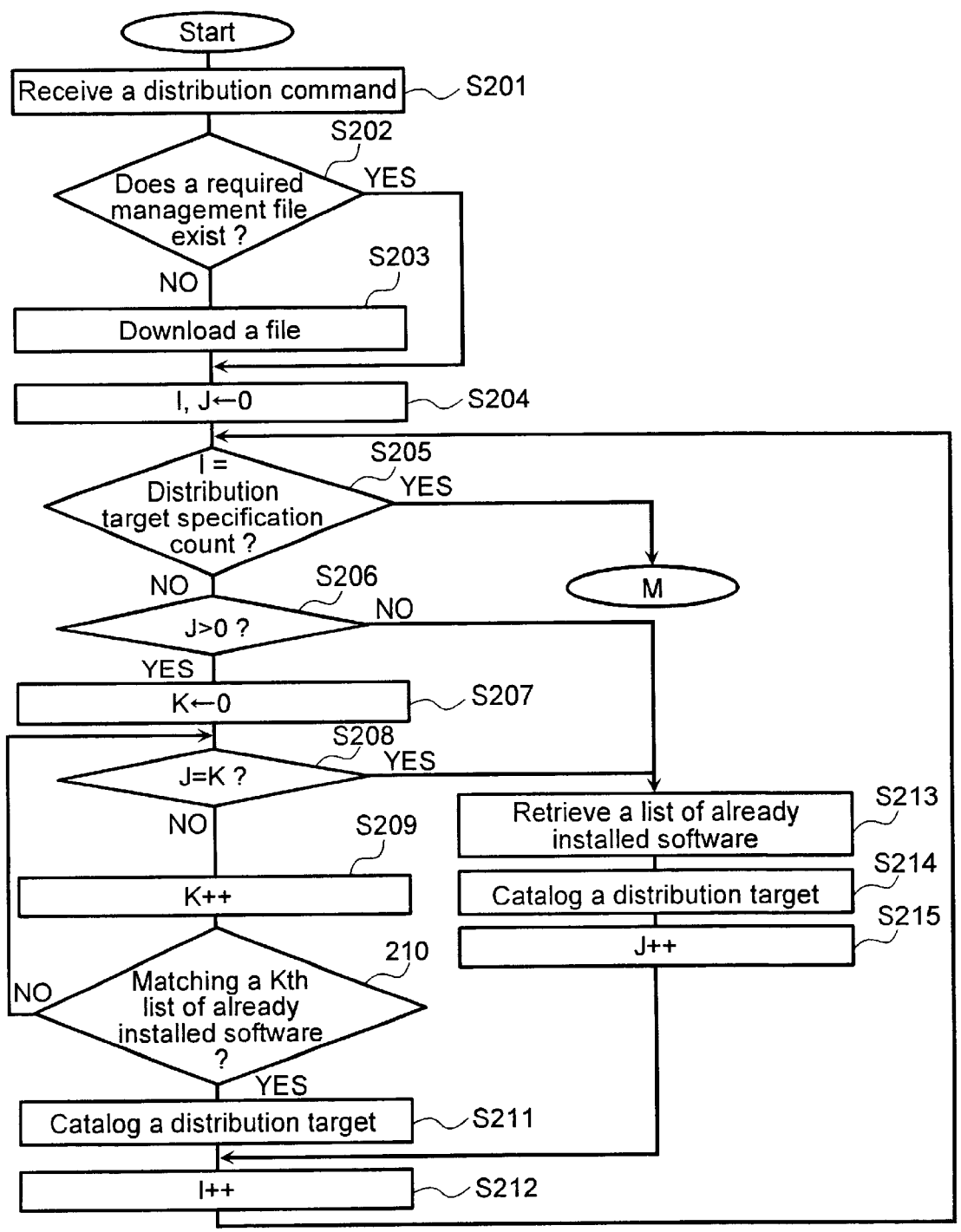
FIG. 22 shows a flowchart representing grouping of distribution targets and processing to extract premise software during a period of time between reception of a command making a request for software distribution and actual execution of the distribution.
Figure 23:
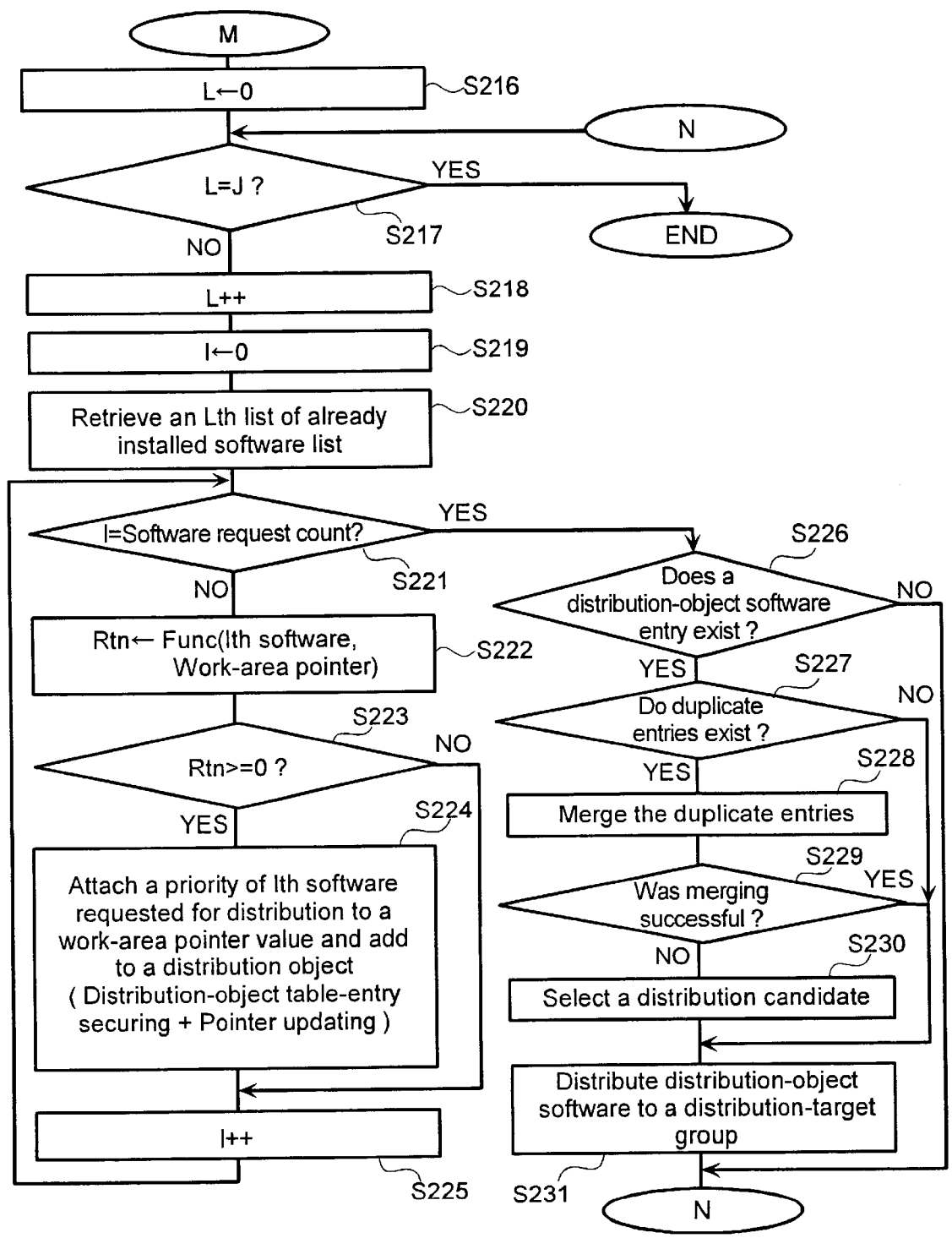
FIG. 23 shows a flowchart representing grouping of distribution targets and processing to extract premise software during a period of time between reception of a command making a request for software distribution and actual execution of the distribution.

FIGS. 22 and 23 each show a flowchart representing grouping of distribution targets and processing to extract premise software during a period of time between reception of a command making a request for software distribution and actual execution of the distribution. The flowchart shown in FIG. 23 begins with a step S201 at which a command making a request for software distribution is received. The flow of the processing then goes on to a step S202 to determine whether a required management file exists in a data base. If the required management file does not exist in the data base, that is, if the result of the determination at the step S202 is NO, the flow of the processing goes on to a step S203 at which the required management file is downloaded. In pieces of processing carried out at steps S204 to S215, targets of distribution are grouped. To put it in detail, targets of distribution having the same already installed software are put in the same group. At the end of the processing, controlled systems each specified as a target of distribution are divided into J groups.

In the processing represented by the flowchart shown in FIG. 23, software to be distributed to each group of distribution targets is identified. At a step S220, a list of pieces of already installed software for an Lth group of distribution targets is retrieved. At a step S222, a function for finding software to serve as an object of distribution is called with software requested for distribution specified as an argument. At the next step S223, a return value received from the function is examined. If the return value is found positive, that is, if the result of the examination at the step S223 is YES, the flow of the processing goes on to a step S224 at which the priority level of the software requested for distribution is added to information on the software to serve as an object of distribution stored in a work area and the information is added to the distribution-object table as a new entry of software to serve as an object of distribution. The work area used for storing the information is released. The flow of the processing then goes back to a step S221 by way of a step S225 at which a variable I is incremented. At the step S221, the variable I is compared with the number of commands each making a request for software distribution. The pieces of processing carried out at the steps S221 to S225 are repeated till all the commands each making a request for software distribution are processed or till a YES result of comparison is obtained at the step S221. As the processing of all the commands each making a request for software distribution is completed as indicated by a YES result of the comparison at the step S221, the flow of the processing goes on to a step S226 to determine whether an entry of software to serve as an object of distribution exists. If an entry of software to serve as an object of distribution exists, the flow of the processing goes on to a step S227 to determine whether duplicate entries exist. If duplicate entries exist, that is, if the result of the determination at the step S227 is YES, the flow of the processing goes on to a step S228 at which the duplicate entries are merged into a single entry. At the next step S229, a result of the merging is examined to determine If the duplicate exists have been merged successfully. If the duplicate exists were not merged successfully, the flow of the processing goes on to a step S230. At the step S230, a most appropriate distribution-object entry or a most proper candidate is selected as an object to be distributed in case distribution-object entries specifying the same software as an object to be distributed or a plurality of candidates exist. The selection of a most appropriate distribution-object entry or a most proper candidate is based on conditions set in advance. In this case, the selected distribution-object entry or the selected most proper candidate may be a newest version, a version requiring a smallest storage area or a shortest installation time or a lowest-cost version.

Figure 25:
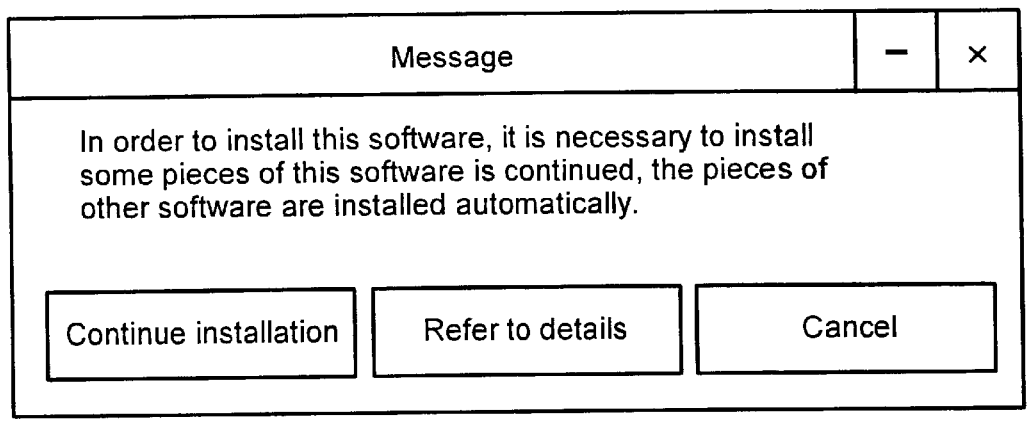
FIG. 25 is a diagram showing a typical display of a message notifying the user that it is necessary to install software other than software requested for distribution.
Figure 26:
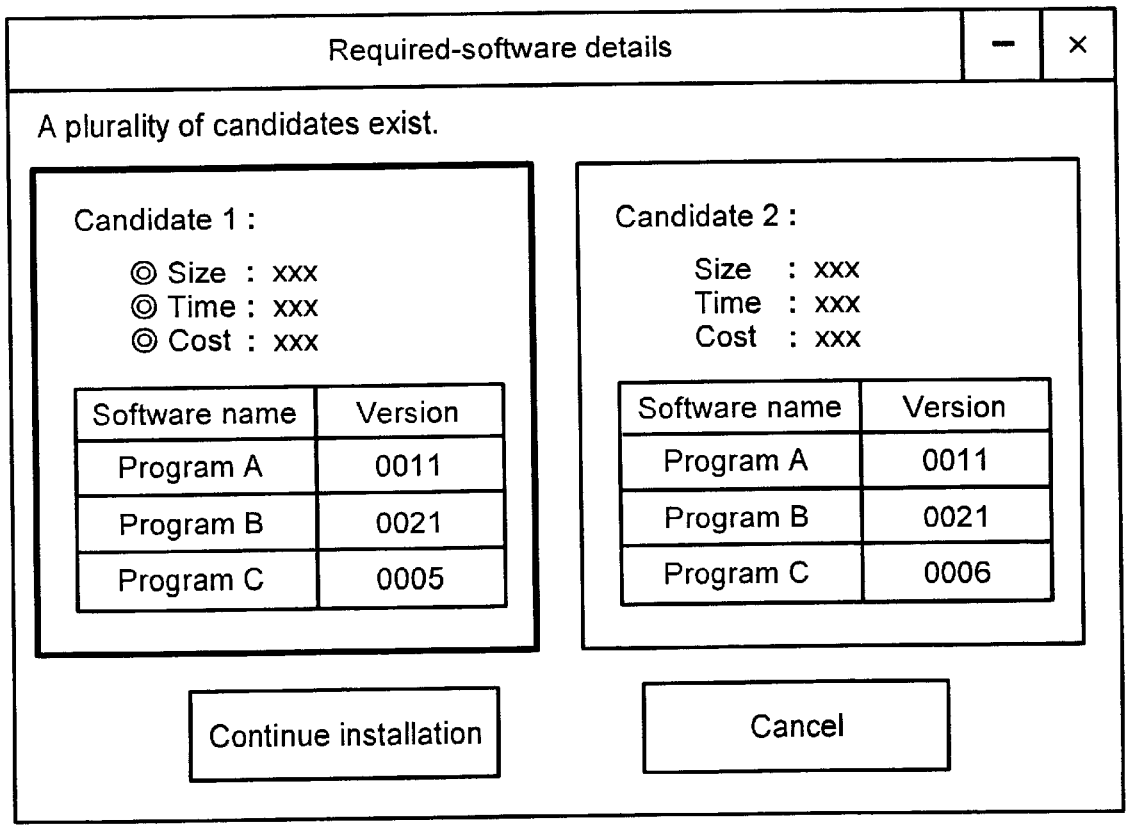
FIG. 26 is a diagram showing a typical display of a screen for notifying the user that there are a plurality candidates for software to serve as an object of distribution.

A most appropriate distribution-object entry or a most proper candidate may be selected automatically, As an alternative, a person in charge of management of a control system or the user of a controlled system may select a most appropriate one among several candidates. FIGS. 25 and 26 are each a diagram showing a typical display of a screen for notifying the user that there are a plurality candidates from which an appropriate one is to be selected.

Figure 24:
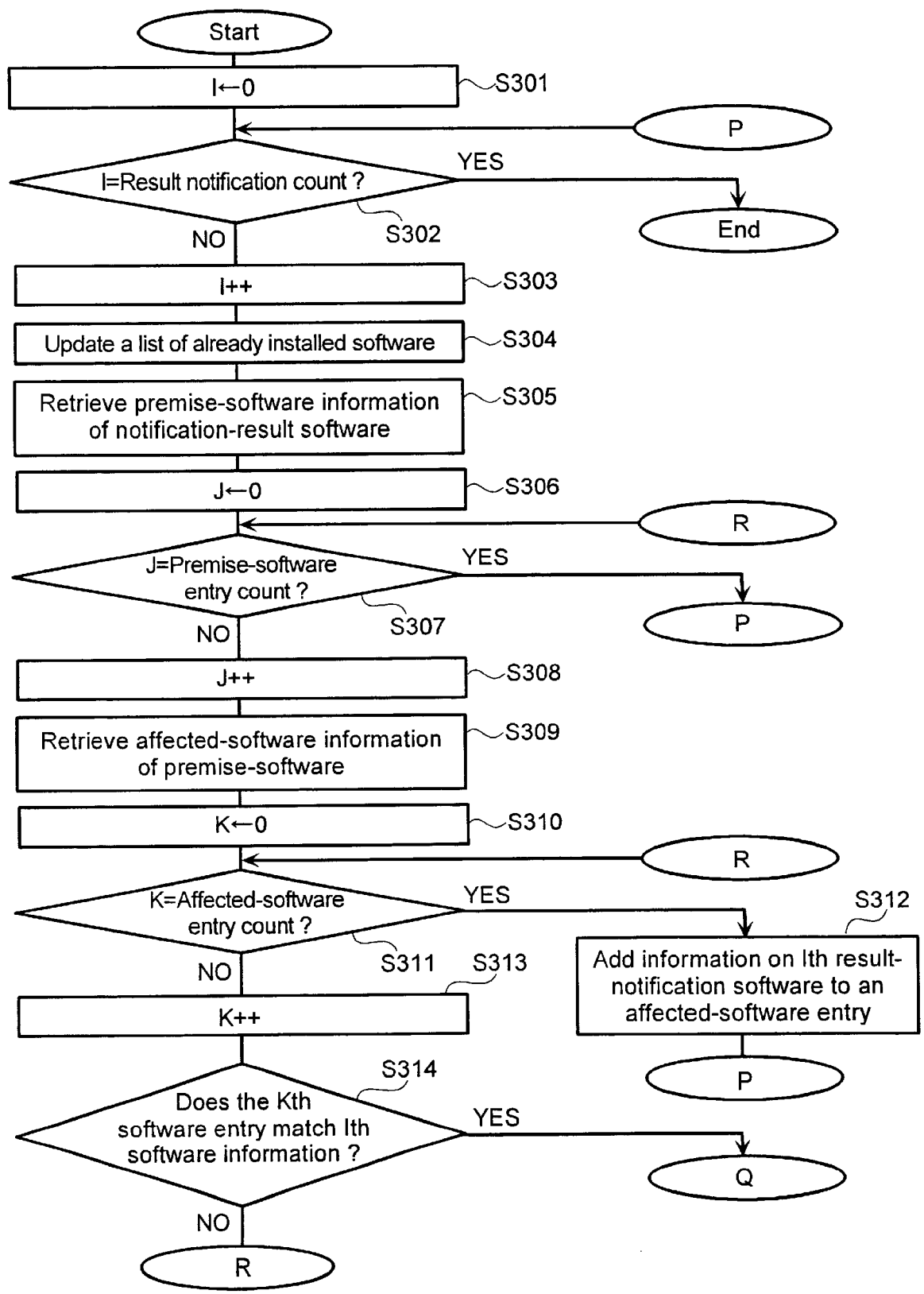
FIG. 24 shows a flowchart representing processing to update information on already installed software and information on affected software on the basis of a result of software distribution.

FIG. 24 shows a flowchart representing processing to update information on already installed software and information on affected software on the basis of a result of software distribution (or a notification of a software distribution result). At a step S304, a list of pieces of already installed software is updated with a result of software distribution. At steps S307 to S314, each premise software of software specified in the notification of the software distribution result is examined to determine whether the software specified in the notification of the distribution result is included on a list of pieces of software affected by the premise software. If no software specified in the notification of the distribution result is found included on the list of pieces of software affected by the premise software, that is, if the result of determination at a step S311 is YES, the flow of the processing goes on to a step S312 at which the list of pieces of software affected by the premise software is updated. Then, the flow of the processing goes back to the first step of the flowchart to repeat the same operations till the processing for all pieces of information is completed.

FIG. 25 is a diagram showing a typical display of a message notifying the user that it is necessary to install software other than software requested for distribution.

FIG. 26 is a diagram showing a typical display in case details of the display shown in FIG. 25 need to be referred to.

If there are a plurality of candidates for a combination of pieces of distributed software or a plurality of candidates for a version from which a most appropriate candidate can be selected on the basis of a variety of conditions, the display of the most appropriate candidate can be emphasized. In automatic selection of a most proper candidate, as a criterion of candidate selection, a newest version, a version requiring a smallest storage area or a shortest installation time or a lowest-cost version may be selected. As an alternative a candidate with proven installation records in other controlled systems may also be selected. The criterion of candidate selection may also be switched from one to another.

In addition, by displaying information serving as a criterion of candidate selection, the person in charge of software management or the user is capable of selecting a most appropriate candidate from a list of candidates with ease.

In this embodiment, the software operator and the user are capable of having desired software distributed and installed without the necessity of being aware of interdependence among pieces of software. The embodiment not only allows the work to distribute and install software to be simplified, but also avoids problems such as already operating software's ceasing to work due to installation of some software. As a result, the embodiment exhibits an effect of smooth software distribution and installation operations.

Moreover, by assigning priority levels to software, a piece of software with a high degree of importance or a high frequency of use can be distributed and installed, being allowed to take precedence of others. Furthermore, by identifying required software at a stage of determining desired software or software to be distributed, it is possible to reduce, among others, the load of the network, the storage capacity of a recording medium for distributing software and a load to be borne at the installation time.

By virtue of the present invention, the work to distribute software to and install the software into a computer can be made simple.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A software distribution method for distributing software from a first computer to a second computer, said software distribution method comprising the steps of:

controlling first software and second software required for using said first software by associating said first software with said second software;

controlling third software already installed in a controlled system by associating said third software with said controlled system;

controlling fourth software affected by updating of said third software by associating said fourth software with said third software;

receiving a command making a request for distribution of said first software;

finding said fourth software affected by updating of said third software and treating said fourth software like another version of said first software if said first software is an updated version of said third software;

finding a range of versions of said second software matching said third software; and taking an updated version of said fourth software treated like another version of said first software and suitable for a range of versions of said first software specified by said command making a request for distribution of said first software as an object to be distributed if a version of said first software specified by said command is not included in said range of versions of said second software required for using said fourth software.

2. A software distribution method according to claim 1 whereby:

software installed in said controlled system is controlled by assigning a use priority level to said software;

a priority level of software taken as an object to be distributed is compared with said use priority level assigned to said software already installed in said controlled system in execution of a command making a request for distribution of said software taken as an object to be distributed; and if distribution of at least said first or second software taken as an object to be distributed makes at least said third or fourth software already installed in said controlled system unusable, said first or second software is distributed provided that said priority level of said first or second software is higher than said use priority level assigned to said third or fourth software.

3. A software distribution, method according to claim 2 whereby, if a plurality of selectable versions of said object to be distributed exist, a version of said object to be distributed is selected so as to satisfy at least one of conditions including version recentness, a version size, a version installation time and a cost.

4. A software distribution method according to claim 1 whereby:
controlled systems that are each specified as a target of software distribution and have the same piece of said already installed third software are put in a group; and
said required second software is distributed to all controlled systems pertaining to the same group.

5. A software distribution method according to claim 1 whereby said first software specified by said command making a request for distribution of said first software and said object to be distributed are distributed by adding information on an order of installation to said first software and said object.

6. A software distribution method according to claim 1 whereby said first computer controls information on software already installed in controlled systems by classifying said information by controlled system.

7. A software distribution method according to claim 1 whereby said second computer:
receives said first software specified by said command making a request for distribution of said first software and said second software taken as an object to be distributed and installs said first software and said second software taken as an object to be distributed; and
updates information on said fourth software if said installation is successful.

8. A software distribution method according to claim 1 whereby said first software specified by said command making a request for distribution of said first software and said second software taken as an object to be distributed are checked prior to transmission to said second computer.

9. A software distribution method according to claim 1 whereby, when said first software specified by said command making a request for distribution of said first software and said object to be distributed are distributed to said second computer by way of a third computer, said third computer stores at least one of said first software specified by said command and said second software in a software memory means provided in said third computer, and if at least one said first software specified by said command making a request for distribution of said first software and said object to be distributed do not exist in said software memory means provided in said third computer, said first software specified by said command or said second software that does not exist in said software memory means is distributed from said first computer to said second computer.

10. A software distribution method according to claim 9 whereby, if at least one of said first software specified by said command making a request for distribution of said first software and said object to be distributed do not exist in said software memory means provided in said third computer, said first software specified by said command or said second software that does not exist in said software memory means is distributed from said first computer to said second computer.

11. A software distribution method for distributing software from a first computer to a second computer, said software distribution method comprising the steps of;
controlling first software and second software required for using said first software by associating said first software with second software;
controlling third software already installed in a controlled system by associating said third software with said controlled system;
controlling fourth software affected by updating of said third software by associating said fourth software with said third software;
receiving a command making a request for distribution of said first software;
finding said fourth software affected by updating of said third software and treating said fourth software like said first software if said second software required for using said first software is an updated version of said third software;
finding a range of versions of said second software matching said third software; and
finding a version of said second software as an object to be distributed from a range of versions of said second software required by said first software specified by said command making a request for distribution of said first software and a range of versions of said second software required by said fourth software.

12. A software distribution method according to claim 11 whereby an updated version of said fourth software matching said range of versions of said second software required by said first software specified by said command making a request for distribution of said first software is taken as an object to be distributed if a version in said range of versions of said second software required by said first software specified by said command does not match any said range of versions of said second software required by said fourth software.

13. A software distribution system for distributing software from a first computer to a second computer, said software distribution system comprising:
means for controlling first software and second software required for using said first software by associating said first software with second software;
means for controlling third software already installed in a controlled system by associating said third software with said controlled system;
means for controlling fourth software affected by updating of said third software by associating said fourth software with said third software;
means for receiving a command marking a request for distribution of said first software;
means for finding said fourth software affected by updating of said third software and treating said fourth software like another version of said first software if said first software is an updated version of said third software;
means for finding a range of versions of said second software matching said third software; and
means for taking an updated version of said fourth software treated like another version of said first software and suitable for a range of versions of said first software specified by said command making a request for distribution of said first software as an object to be distributed if a version of said first software specified by said command is not included in said range of versions of said second software required for using said fourth software.

14. A software distribution system according to claim 13 whereby:
software installed in said controlled system is controlled by assigning a use priority level to said software;
a priority level of software taken as an object to be distributed is compared with said use priority level assigned to said software already installed in said controlled system in execution of a command making a request for distribution of said software taken as an object to be distributed; and if distribution of at least said first or second software taken as an object to be distributed makes at least said third or fourth software already installed in said controlled system unusable, said first or second software is distributed provided that said priority level of said first or second software is higher than said use priority level assigned to said third or fourth software.

15. A software distribution system according to claim 13 whereby said second computer:

receives said first software specified by said command making a request for distribution of said first software and said second software taken as an object to be distributed and installs said first software and said second software taken as an object to be distributed; and updates information on said fourth software if said installation is successful.

16. A software distribution system according to claim 13 whereby said first software specified by said command making a request for distribution of said first software and said second software taken as an object to be distributed are referenced checked prior to transmission to said second computer.

* * * * *